(12) United States Patent
Ferm et al.

(10) Patent No.: US 10,288,525 B2
(45) Date of Patent: May 14, 2019

(54) BEARING TESTING APPARATUS AND METHOD

(71) Applicant: Hyperloop Technologies, Inc., Los Angeles, CA (US)

(72) Inventors: Jett Ferm, Los Angeles, CA (US); James Coutre, Los Angeles, CA (US); Ryan Okerson, Los Angeles, CA (US); Cassandra Mercury, Pasadena, CA (US); David Dehaan, Los Angeles, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 15 days.

(21) Appl. No.: 15/298,905

(22) Filed: Oct. 20, 2016

(65) Prior Publication Data

US 2017/0108405 A1      Apr. 20, 2017

Related U.S. Application Data

(60) Provisional application No. 62/243,875, filed on Oct. 20, 2015.

(51) Int. Cl.
    *G01M 99/00*        (2011.01)
    *G01M 13/04*        (2019.01)
    (Continued)

(52) U.S. Cl.
    CPC .............. *G01M 13/04* (2013.01); *G01M 9/04* (2013.01); *F16C 32/0406* (2013.01);
    (Continued)

(58) Field of Classification Search
    USPC ............................ 73/104, 105, 118.01, 865.6
    See application file for complete search history.

(56) References Cited

U.S. PATENT DOCUMENTS 4,527,980 A * 7/1985 Miller .................... G06T 15/10
                                                          434/51
5,316,480 A * 5/1994 Ellsworth .............. A63G 31/16
                                                          434/29
(Continued)

OTHER PUBLICATIONS

International Search Report in PCT/US2016/057943 dated Jan. 9, 2017.

(Continued)

*Primary Examiner* — Eric S. McCall
(74) *Attorney, Agent, or Firm* — Greenblum & Bernstein, P.L.C.

(57) ABSTRACT

A testing apparatus includes a chamber, having an interior maintained at a predetermined pressure, a rotor rotatably disposed within the interior of the chamber, and a sensor disposed within the interior of the chamber. When the rotor rotates, the at least one sensor measures a testing characteristic of an object disposed within the interior of the chamber as the object interacts with the rotating rotor. A method includes setting a predetermined pressure of a chamber, rotating a rotor, and maintaining a gap between a surface of an object to be tested and a surface of the rotor by adjusting, with an actuator, the object to be tested or the rotor based upon a change, as measured by a laser, in the dimension of the object to be tested or the rotor.

18 Claims, 31 Drawing Sheets

(51) Int. Cl.
*G01M 9/04* (2006.01)
*F16C 32/04* (2006.01)
*F16C 32/06* (2006.01)

(52) U.S. Cl.
CPC ...... *F16C 32/0603* (2013.01); *F16C 2300/22* (2013.01); *F16C 2300/62* (2013.01)

(56) References Cited

U.S. PATENT DOCUMENTS

| | | | |
|---|---|---|---|
| 5,533,388 A * | 7/1996 | Yamamoto | G01M 17/0072 73/116.01 |
| 5,574,226 A * | 11/1996 | Reuther | G01M 17/04 73/669 |
| 7,025,660 B2 | 4/2006 | Taylor et al. | |
| 8,729,722 B2 | 5/2014 | Damen et al. | |
| 2002/0088271 A1* | 7/2002 | Sigwart | G01M 99/002 73/114.61 |
| 2003/0006756 A1 | 1/2003 | Tsuruta | |
| 2008/0010037 A1* | 1/2008 | Hashizume | F02D 41/009 702/151 |
| 2009/0241649 A1* | 10/2009 | Omuro | G01M 15/06 73/114.26 |
| 2013/0098139 A1 | 4/2013 | Adams, Jr. | |
| 2016/0229427 A1* | 8/2016 | Avetian | B61B 13/10 |
| 2017/0102287 A1* | 4/2017 | Okerson | G01M 9/04 |

OTHER PUBLICATIONS

Written Opinion of the International Searching Authority in PCT/US2016/057943 dated Jan. 9, 2017.

* cited by examiner

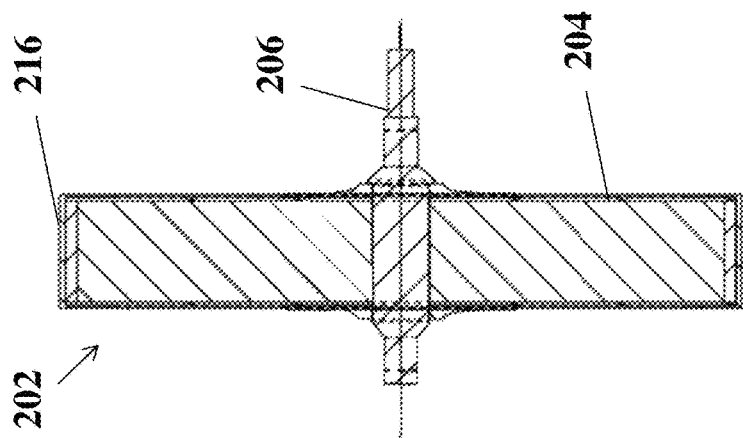
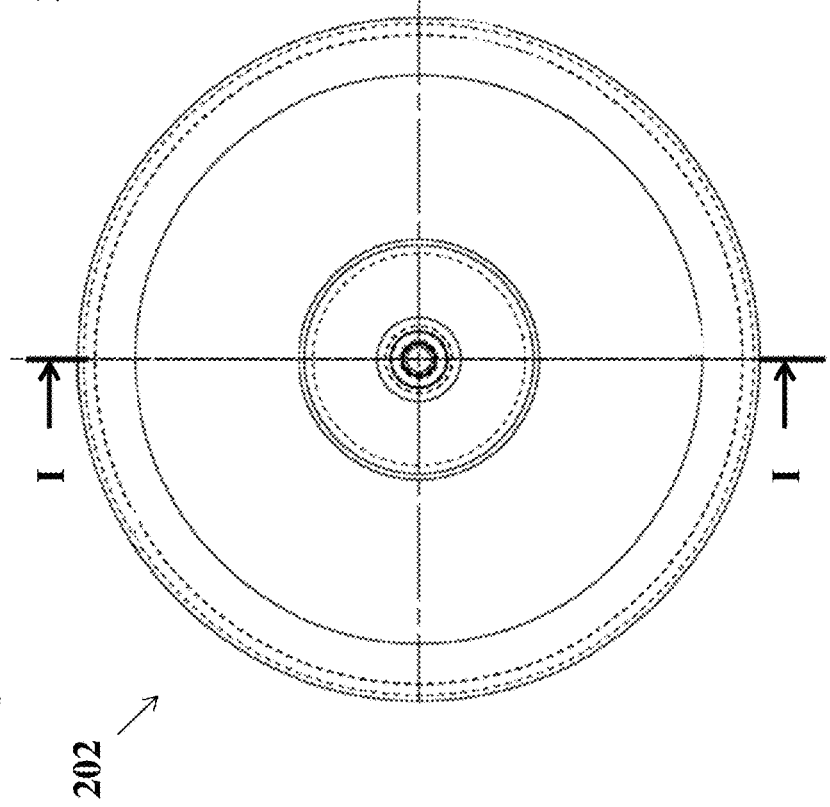

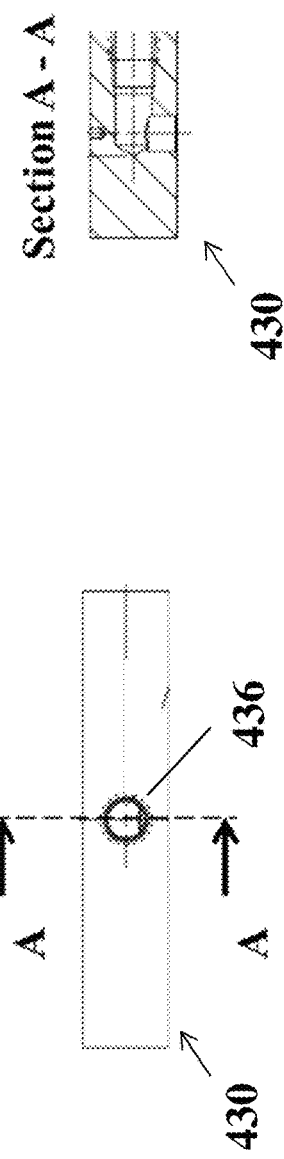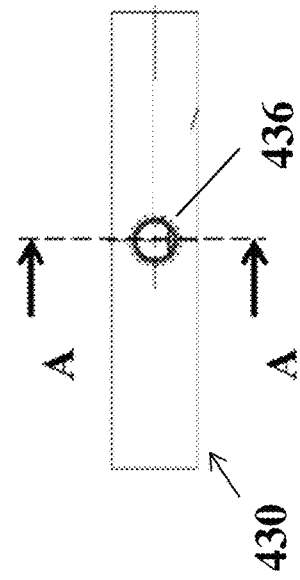

Section B - B

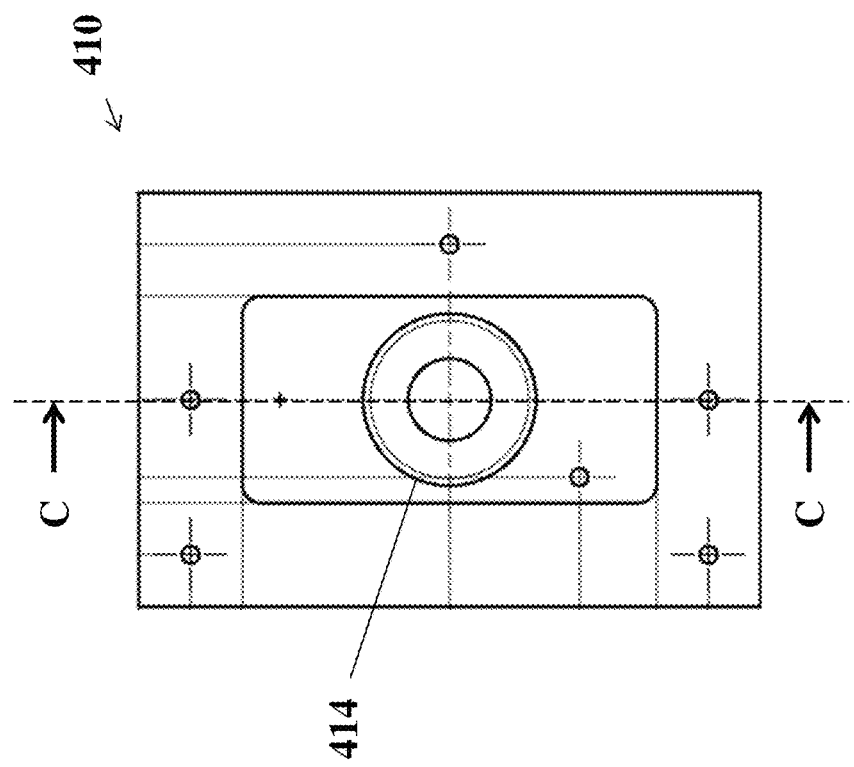

Section C - C

BEARING TESTING APPARATUS AND METHOD

CROSS REFERENCE TO RELATED APPLICATION

The present application claims the benefits of U.S. Provisional Application No. 62/243,875 filed on Oct. 20, 2015, the disclosure of which is expressly incorporated by reference herein in its entirety.

FIELD OF THE DISCLOSURE

The present disclosure relates a testing apparatus including a chamber having an interior maintained at a pressure and a rotor disposed within the interior of the chamber, and a method for maintaining a gap between a surface of a bearing and a surface of a rotor disposed within a chamber maintained at a pressure.

BACKGROUND OF THE DISCLOSURE

Traditional transportation modes via water, land, rail and air revolutionized the movement and growth of our current culture. However, the adverse environmental, societal and economic impacts of these traditional transportation models initiated a movement to find alternative transportation modes that take advantage of the significant improvements in transportation technology and efficiently move people and materials between locations. High speed transportation systems utilizing rails or other structural guidance components have been contemplated as a solution to existing transportation challenges while improving safety, decreasing the environmental impact of traditional transportation modes and reducing the overall time commuting between major metropolitan communities.

One type of transportation system utilizes a low-pressure environment in order to reduce drag on a vehicle at high operating speeds, thus providing the dual benefit of allowing greater speed potential and lowering the energy costs associated with overcoming drag forces. Such systems are embodied by a tubular structure in which a near vacuum exists within the tube; thus, these systems utilize any number of acceleration systems to achieve the high operating speeds.

Frictional forces resulting from the high operating speeds of the vehicle render conventional carrier systems, such as wheels, impractical. Air bearings or magnetic levitation bearings have been turned to as an alternative to conventional carrier systems. Such air bearings may utilize a thin film of pressurized air to provide an exceedingly low friction load-bearing interface between surfaces and such magnetic levitation bearings may provide a magnetic repulsion force that defines a low friction load-bearing interface between surfaces. However, since air bearings and magnetic levitation bearings have not previously been known to be utilized in ultra-high speed, ultra low-pressure environments, there is a need for a testing environment with controlled pressure that can replicate high speed conditions.

SUMMARY OF EMBODIMENTS OF THE DISCLOSURE

A testing apparatus includes a chamber having an interior maintained at a predetermined pressure, a rotor disposed within the interior of the chamber and configured to rotate within the chamber; and at least one sensor disposed within the interior of the chamber, wherein when the rotor rotates, the at least one sensor is configured to measure a testing characteristic of an object disposed within the interior of the chamber as the object interacts with the rotating rotor.

The predetermined pressure of the interior may be lower than 1 atmosphere, or lower even than 0.001 atmosphere. The predetermined pressure may be a pressure between 0.001 atmosphere and 1 atmosphere. The predetermined pressure may be a pressure between 0.006 atmosphere and 0.018 atmosphere.

The rotor may be configured to rotate to achieve a surface speed that exceeds 300 meters per second (m/s).

The testing characteristic of the object may be at least one of lift, drag, temperature, pressure, and flow speed.

The object may be at least one of an air bearing and a magnetic levitation bearing, and the at least one of the air bearing and the magnetic levitation bearing may provide a load-bearing interface between a surface of the at least one of the air bearing and the magnetic levitation bearing. The load-bearing interface may be provided by a film of pressurized gas that defines a gap between the surface of the air bearing and the surface of the rotor. The load-bearing interface may be provided by a magnetic repulsion force that defines a gap between the magnetic levitation bearing and the surface of the rotor.

The testing apparatus may also include a laser feedback mechanism that may have an actuator configured to adjust a size of the gap between the surface of the air bearing and the surface of the rotor, at least one laser configured to measure a dimension of at least one of the air bearing and the rotor; and a controller configured to control the actuator based upon a change in the dimension measured by the laser. The testing apparatus may also include a laser feedback mechanism that may have an actuator configured to adjust a size of the gap between the surface of the magnetic levitation bearing and the surface of the rotor, at least one laser configured to measure a dimension of at least one of the magnetic levitation bearing and the rotor; and a controller configured to control the actuator based upon a change in the dimension measured by the laser.

The rotor may include a slotted circumferential surface.

An aspect of the disclosure provides a method for maintaining a gap between a surface of an object to be tested and a surface of a rotor disposed within a chamber maintained at a pressure. The method may include setting a predetermined pressure of the chamber, rotating the rotor, and setting the gap between the surface of the object to be tested and the surface of the rotor. The method may also include measuring, using at least one laser, a dimension of at least one of the object to be tested and the rotor. The method may also include maintaining the gap between the surface of the object to be tested and the surface of the rotor by adjusting, with an actuator, at least one of the object to be tested and the rotor based upon a change, as measured by the at least one laser, in the dimension of at least one of the air bearing and the rotor.

The object to be tested may be at least one of an air bearing and a magnetic levitation bearing. The method may also include setting the predetermined pressure of the chamber to a pressure between 0.006 atmosphere and 0.018 atmosphere, and rotating the rotor so as to achieve a surface speed that exceeds 300 meters per second (m/s).

Other exemplary embodiments and advantages of the present disclosure may be ascertained by reviewing the present disclosure and the accompanying drawings, and the above description should not be considered to limit the scope of the present disclosure.

BRIEF DESCRIPTION OF THE DRAWINGS

The novel features which are characteristic of the systems, both as to structure and method of operation thereof, together with further objects and advantages thereof, will be understood from the following description, considered in connection with the accompanying drawings, in which a presently preferred embodiment of the system is illustrated by way of example. It is to be expressly understood, however, that the drawings are for the purpose of illustration and description only, and they are not intended as a definition of the limits of the disclosure. For a more complete understanding of the disclosure, as well as other aims and further features thereof, reference may be had to the following detailed description of the disclosure in conjunction with the following exemplary and non-limiting drawings wherein:

FIG. 18A shows a front view of the rotor according to an aspect of the disclosure;

FIG. 18B shows a sectional view along the sectional line I-I of the rotor shown in FIG. 18A;

FIGS. 22A and 22B respectively show left and right side views of the manifold of FIGS. 21A-2C;

FIG. 22C shows a front view of the manifold according to FIGS. 21A-21C;

FIG. 22D shows a sectional view along the sectional line A-A of the manifold shown in FIG. 22C;

FIG. 24 shows a bottom view of the air bearing shown in FIG. 23A;

DETAILED DESCRIPTION OF EMBODIMENTS OF THE DISCLOSURE

Figure 1:
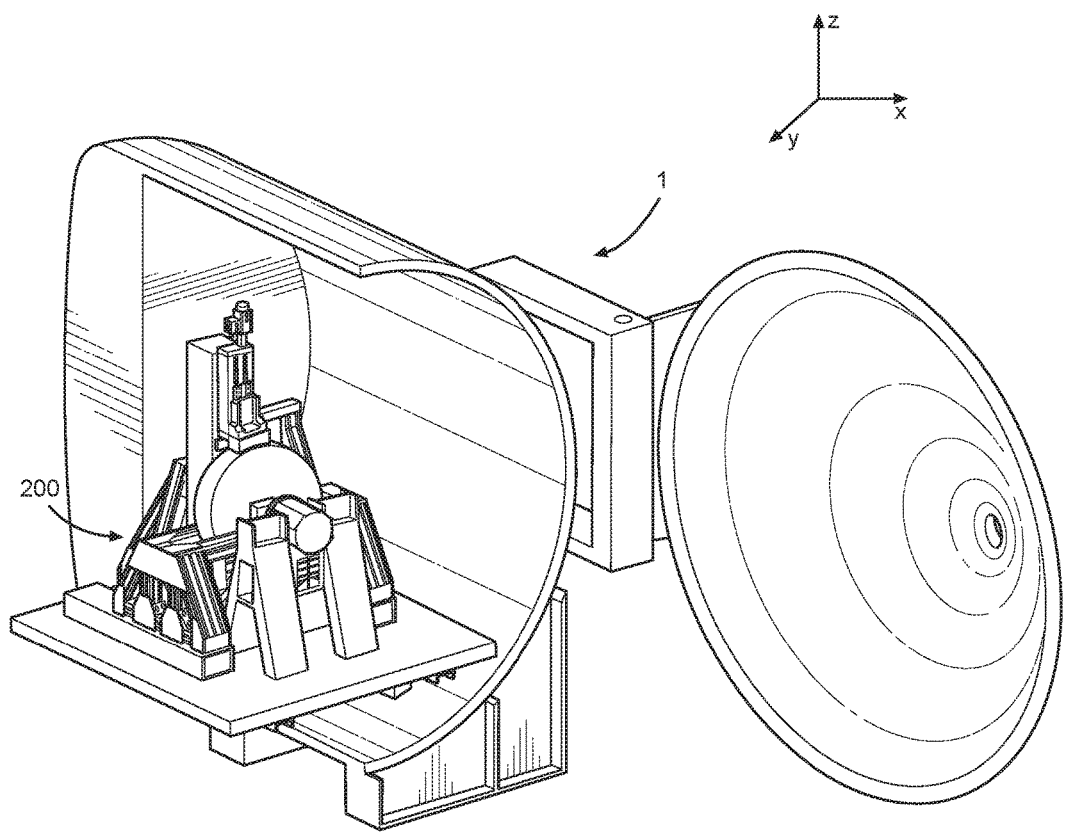
FIG. 1 shows an isometric view of a testing apparatus according to an aspect of the disclosure.

In the following description, the various embodiments of the present disclosure will be described with respect to the enclosed drawings. As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description is taken with the drawings making apparent to those skilled in the art how the forms of the present disclosure may be embodied in practice.

As used herein, the singular forms "a," "an," and "the" include the plural reference unless the context clearly dictates otherwise. For example, reference to "a laser" would also indicate that one or more lasers can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The various embodiments disclosed herein can be used separately and in various combinations unless specifically stated to the contrary.

As used herein, the indefinite article "a" indicates one as well as more than one and does not necessarily limit its referent noun to the singular.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of", so that for instance "a composition comprising a compound A" may also (essentially) consist of the compound A.

The various embodiments disclosed herein can be used separately and in various combinations unless specifically stated to the contrary.

During testing of bearings, such as air bearings or magnetic levitation bearings, for use in ultra-high speed and ultra low-pressure environments; precise gaps must be maintained between the bearing and the testing surface in the test environment. Variations between the bearing surface and the testing surface greater than 10% can drastically reduce effectiveness of the bearing and invalidate the test data collected. In traditional rotating air bearing applications, because the pressure is evenly distributed around the shaft of the air bearings, the gap between the air bearing and the testing surface can be set by machining the air bearing bore and shaft to set tolerances. For linear air bearings that may, for example, have a ride height of less than 0.001 of an inch, the surface of the air bearing must be flat and smooth to within 0.0001 of an inch, or within 10% of the ride height. Maintaining a smooth surface to within such small dimensions is extremely difficult, and typically involves the use of polished granite slabs. Present testing environments that require a flat and smooth surface to within 0.0001 of an inch and enough length to achieve speeds in excess of 300 meters per second (m/s) are impractical.

Figure 2:
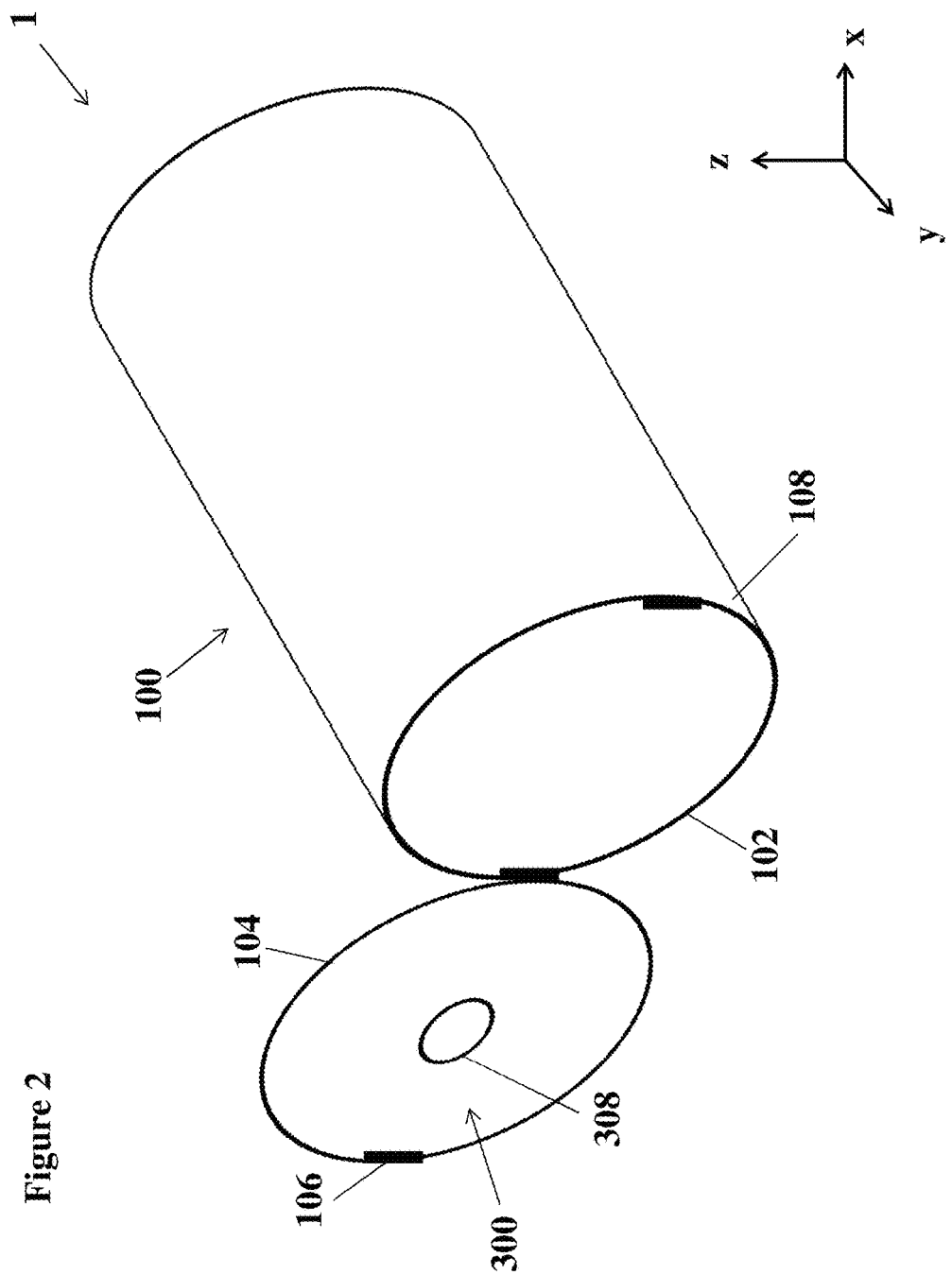
FIG. 2 shows a schematic perspective view of the testing apparatus shown in FIG. 1.
Figure 3:
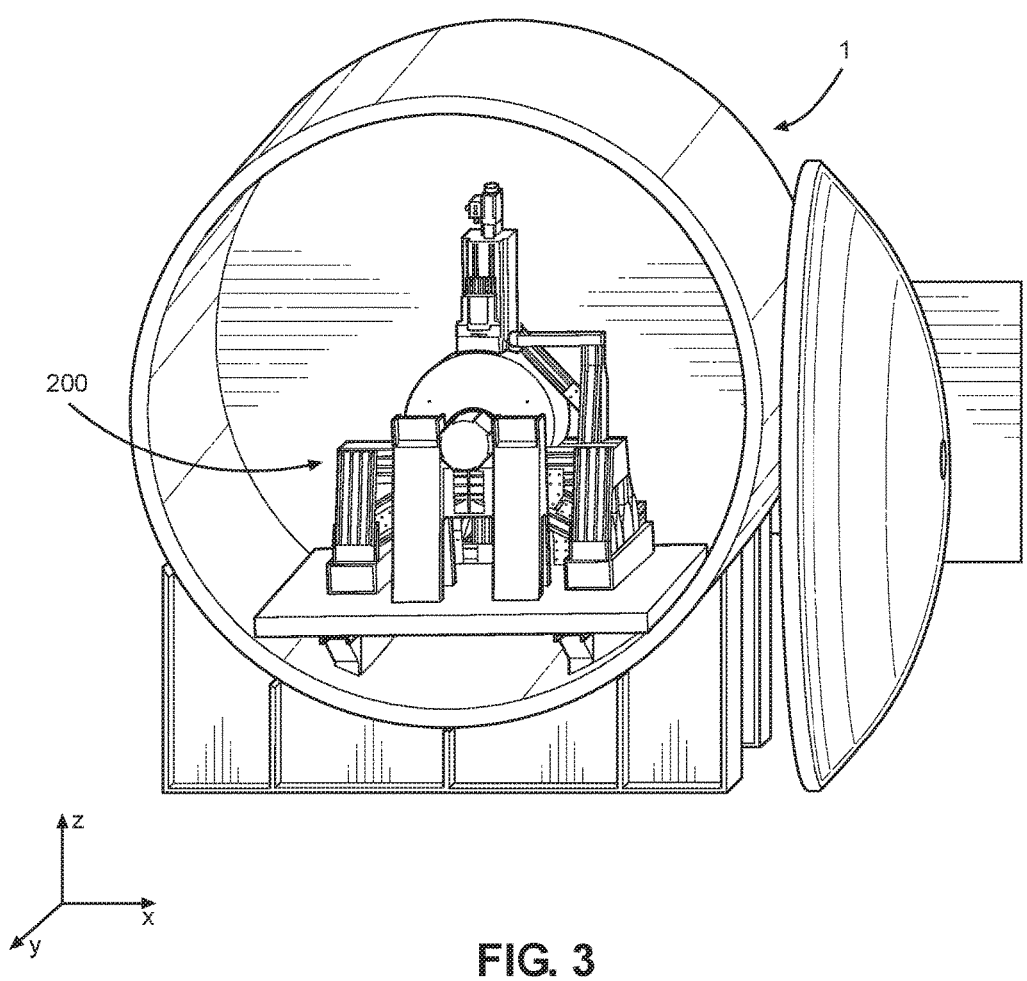
FIG. 3 shows a perspective view of the testing apparatus shown in FIG. 1.
Figure 4:
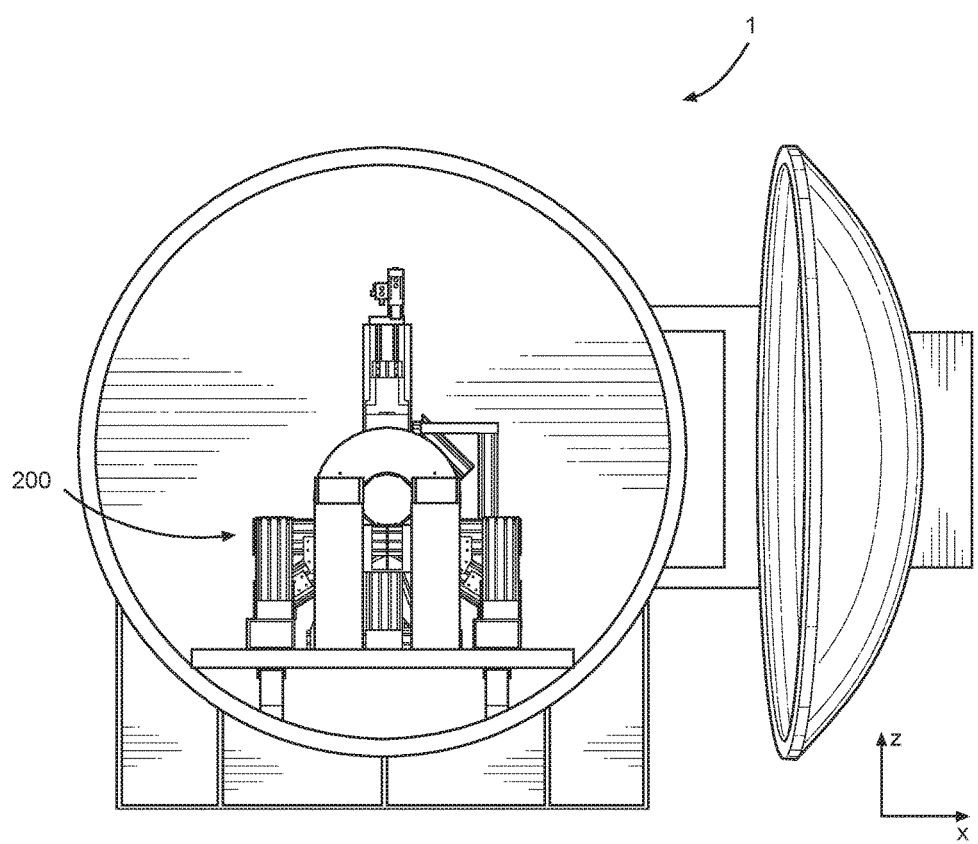
FIG. 4 shows a front view of the testing apparatus shown in FIG. 1.
Figure 5:
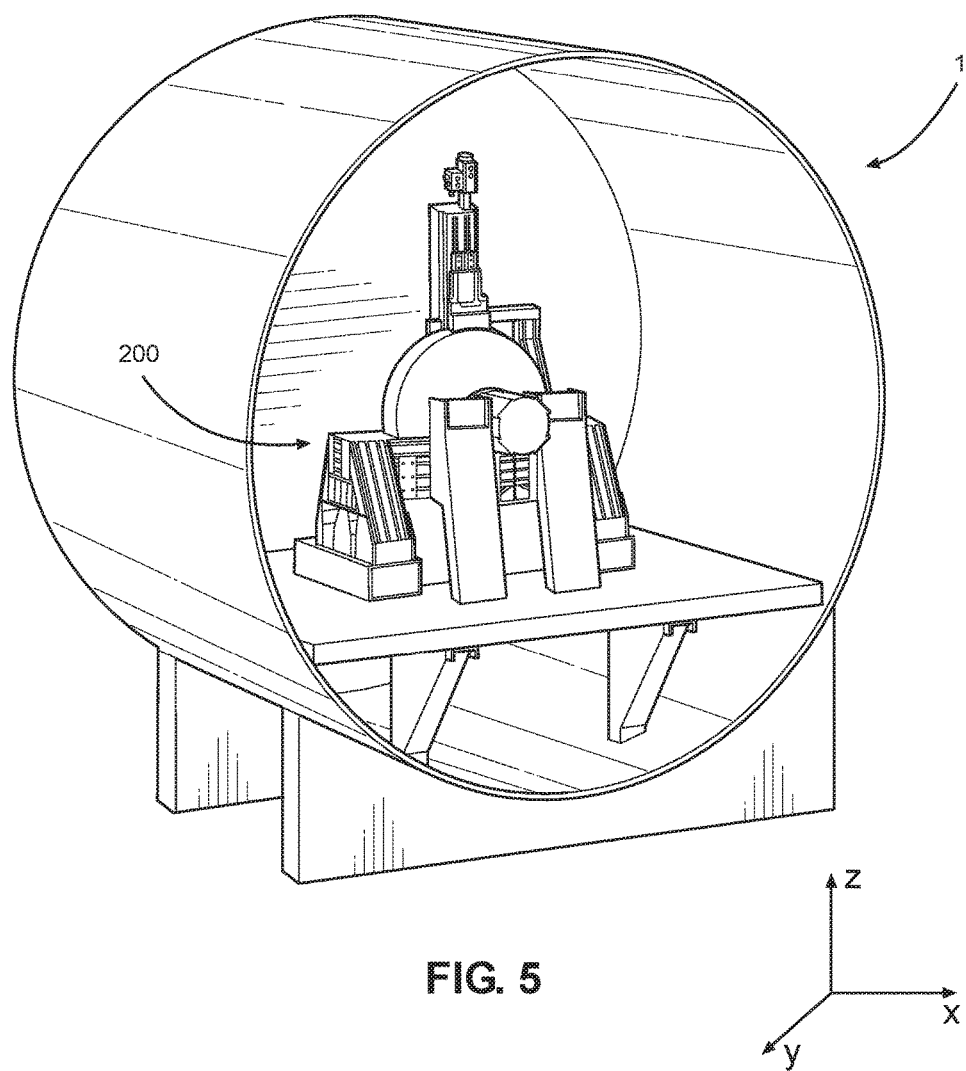
FIG. 5 shows another perspective view of the testing apparatus shown in FIG. 1.
Figure 6:
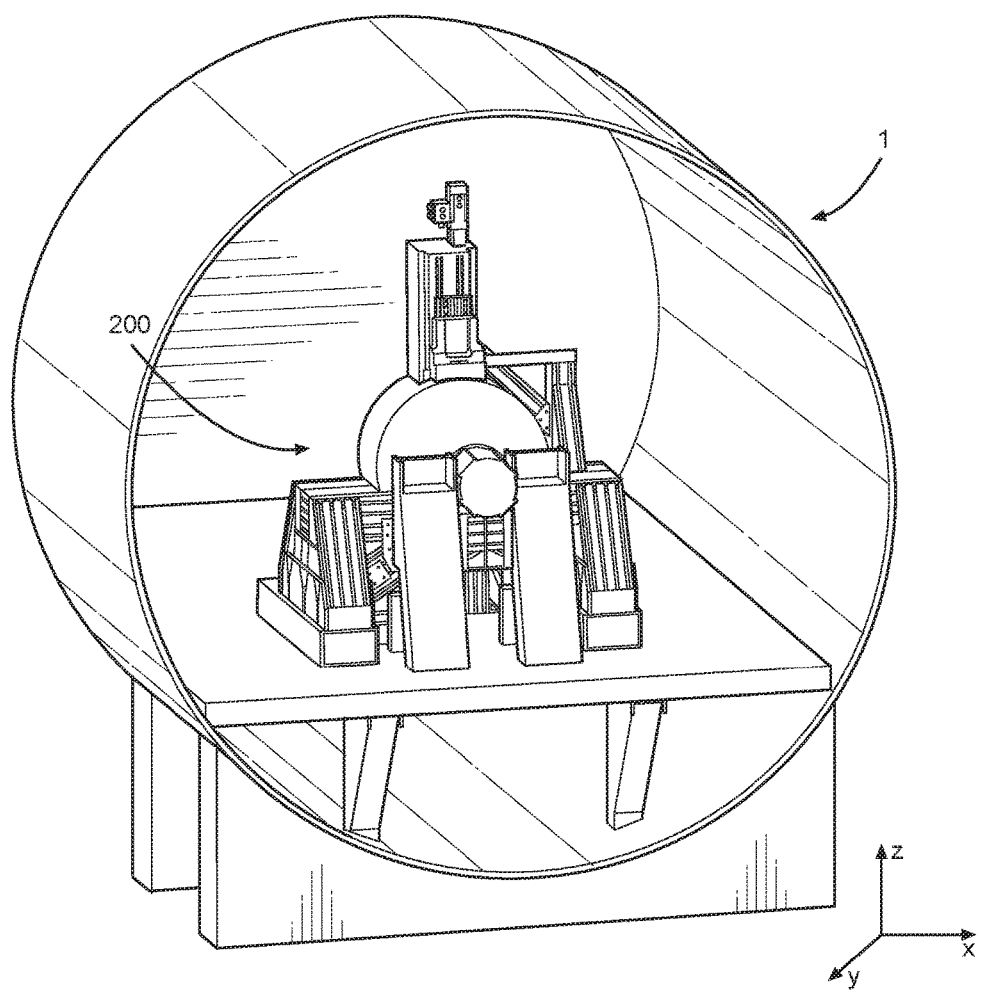
FIG. 6 shows another perspective view of the testing apparatus shown in FIG. 1.

Referring now to FIGS. 1-8, exemplary and non-limiting depictions of a testing apparatus 1, according to an embodiment of the present disclosure, are illustrated. As shown in FIG. 2, the testing apparatus 1 may include an environmental chamber 100 having an interior portion. In embodiments, the environmental chamber 100 may be of a cylindrical shape; however, the shape of the environmental chamber 100 is not limited to a cylindrical shape, and may be a square, rectangular, or any other shape. The environmental chamber 100 may include an opening 102 disposed at an end thereof. The environmental chamber 100 may also include a door 104, that may selectively open and close the opening 102 via a closure system 106 that may include a latch or the like. The door 104 may provide selective access to the interior of the environmental chamber 100 while also providing a seal with a body 108 of the environmental chamber 100 so as to maintain the interior of the environmental chamber 100 at a predetermined pressure. As shown in FIG. 1 and in accordance with aspects of the disclosure, the testing apparatus 1 includes a levitation rig 200 disposed within the interior portion.

In embodiments, the predetermined pressure of the interior of the environmental chamber 100 may be a pressure lower than 1 atmosphere. In other embodiments, the predetermined pressure of the interior of the environmental chamber 100 may be maintained at less than 0.001 atmosphere. In still other embodiments, the predetermined pressure of the interior of the environmental chamber 100 may approach a vacuum pressure. In embodiments, the predetermined pressure may be a pressure between 0.001 atmosphere and 1 atmosphere. In embodiments, the predetermined pressure may be a pressure between 0.006 atmosphere and 0.018 atmosphere. It is also noted that, while the environmental chamber 100 described herein maintains a predetermined pressure of less than 1 atmosphere, it is contemplated that the environmental chamber 100 can be used in other applications, including but not limited to environments in which the interior of the environmental chamber 100 is maintained at or above atmospheric pressure.

Figure 7:
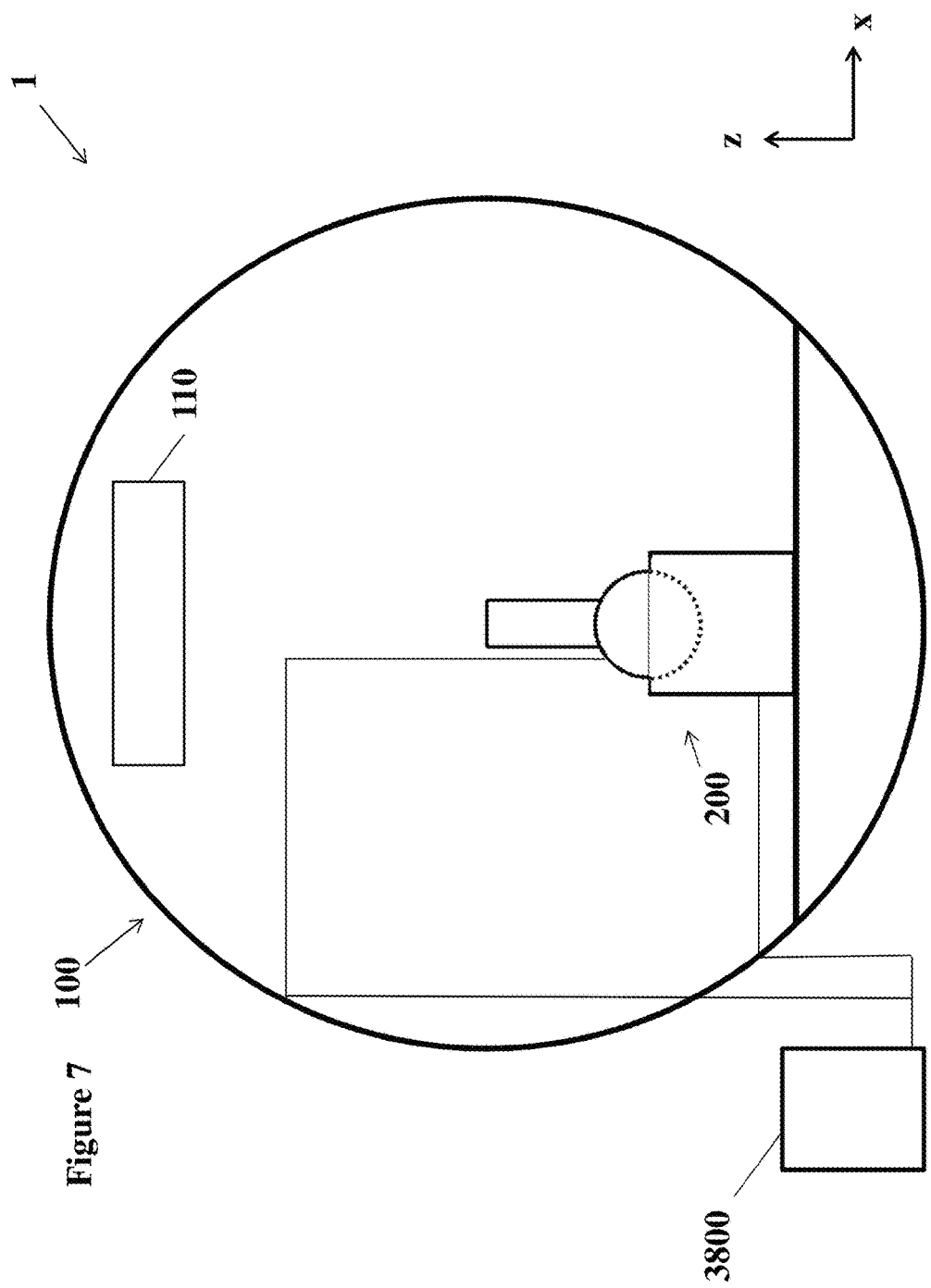
FIG. 7 shows a schematic front view of the testing apparatus shown in FIG. 1.
Figure 8:
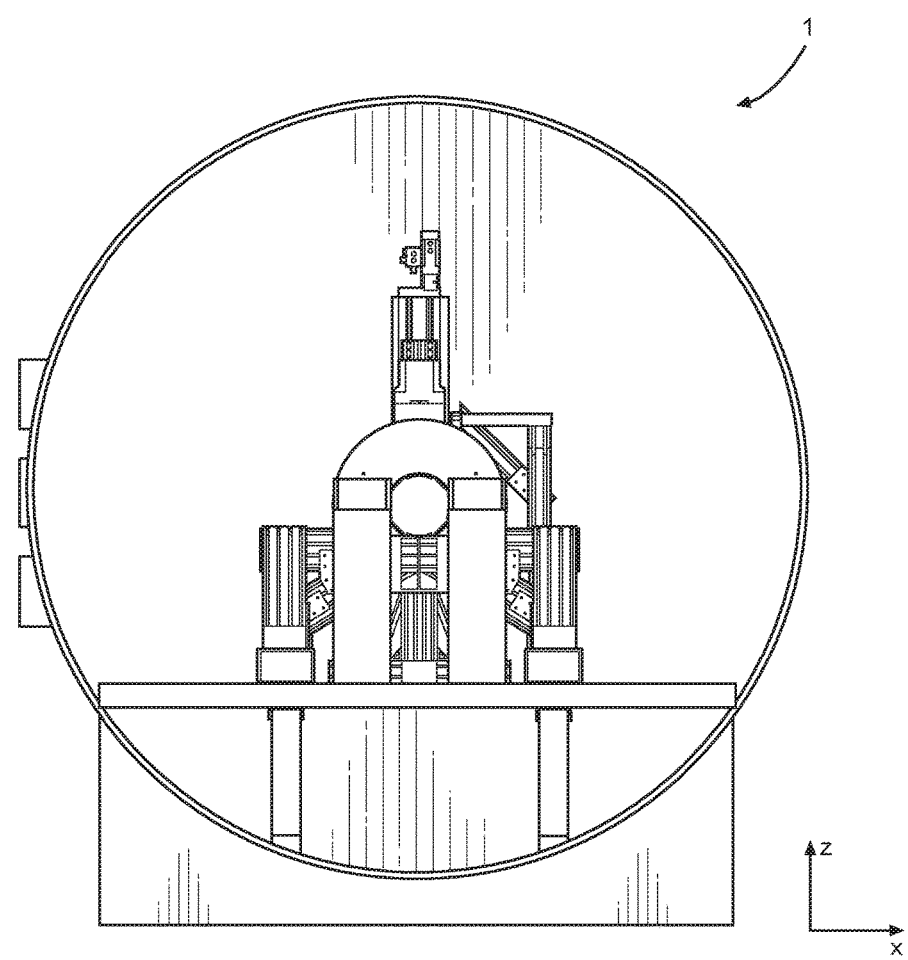
FIG. 8 shows another front view of the testing apparatus shown in FIG. 1.

The testing apparatus 1 may also include a pressure setting system (not shown) for setting the predetermined pressure in the interior of the environmental chamber 100. The pressure setting system may include a pump and a system of ducts in fluid communication with the environmental chamber 100. As shown in FIG. 7, the ducts may communicate with the environmental chamber 100 at a second opening 110 of the environmental chamber 100. The second opening 110 may include a closure (not shown) that may selectively seal the interior of the environmental chamber 100 from the pressure setting system.

Figure 9:
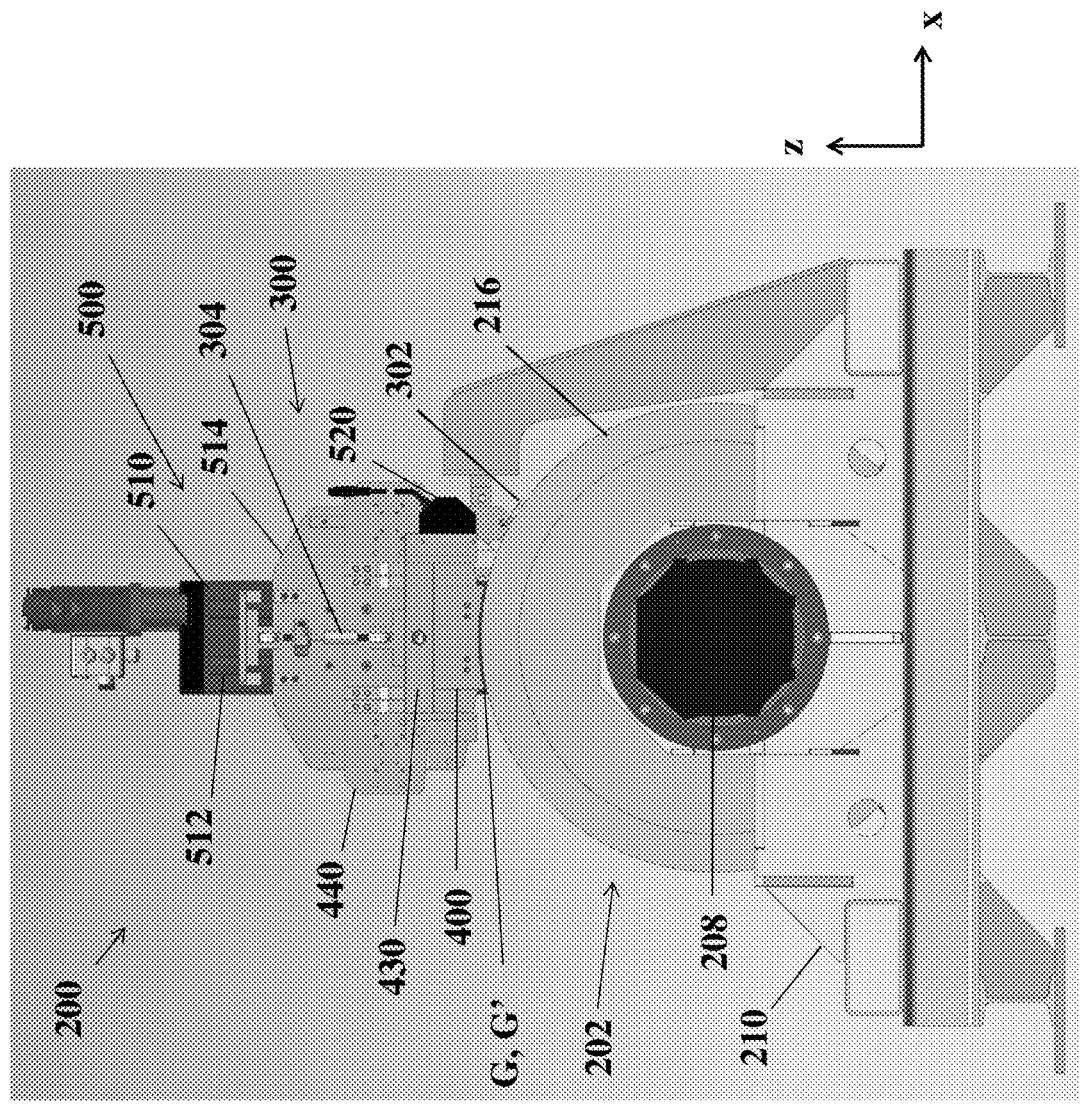
FIG. 9 shows a front view of the levitation rig of the testing apparatus shown in FIG. 1.
Figure 10:
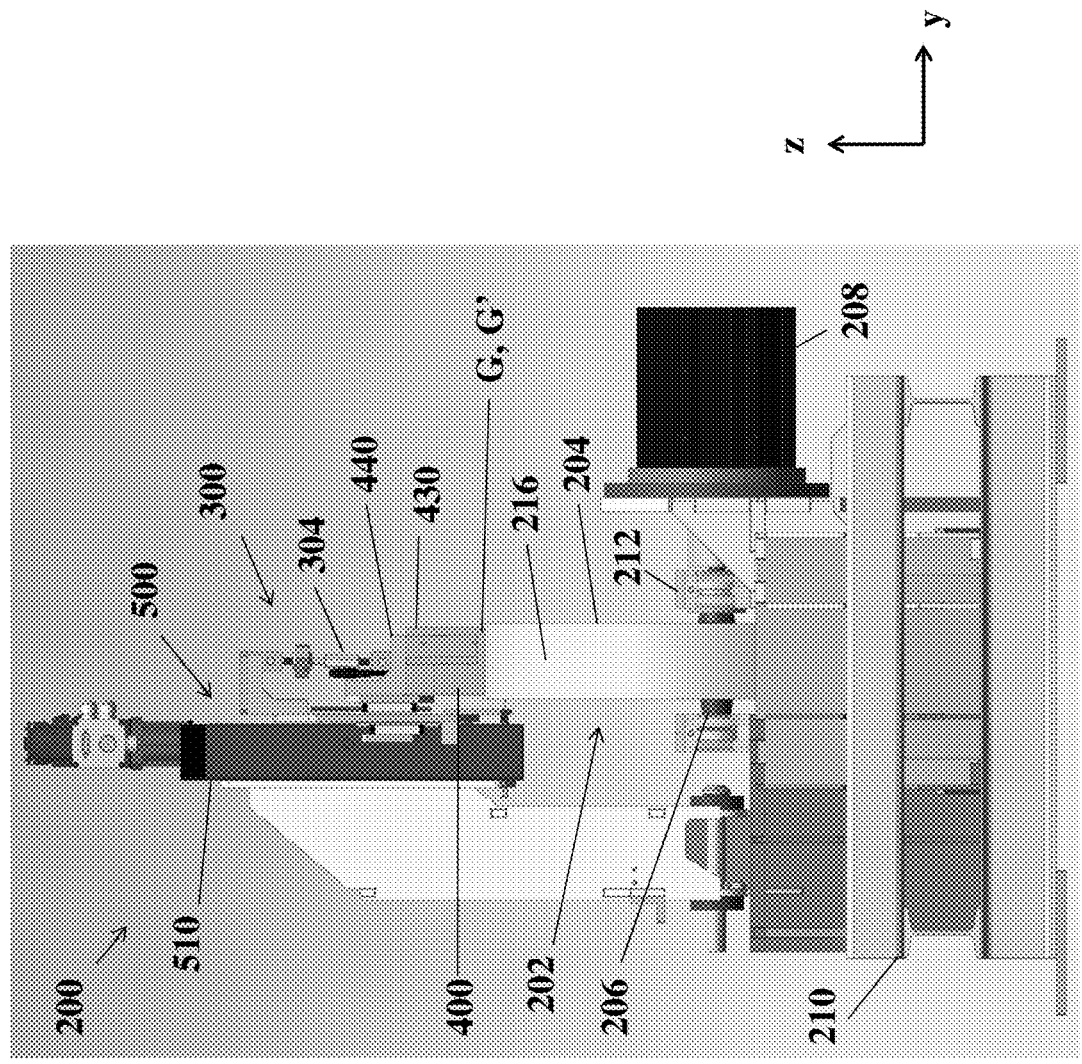
FIG. 10 shows a side view of the levitation rig shown in FIG. 9.
Figure 11:
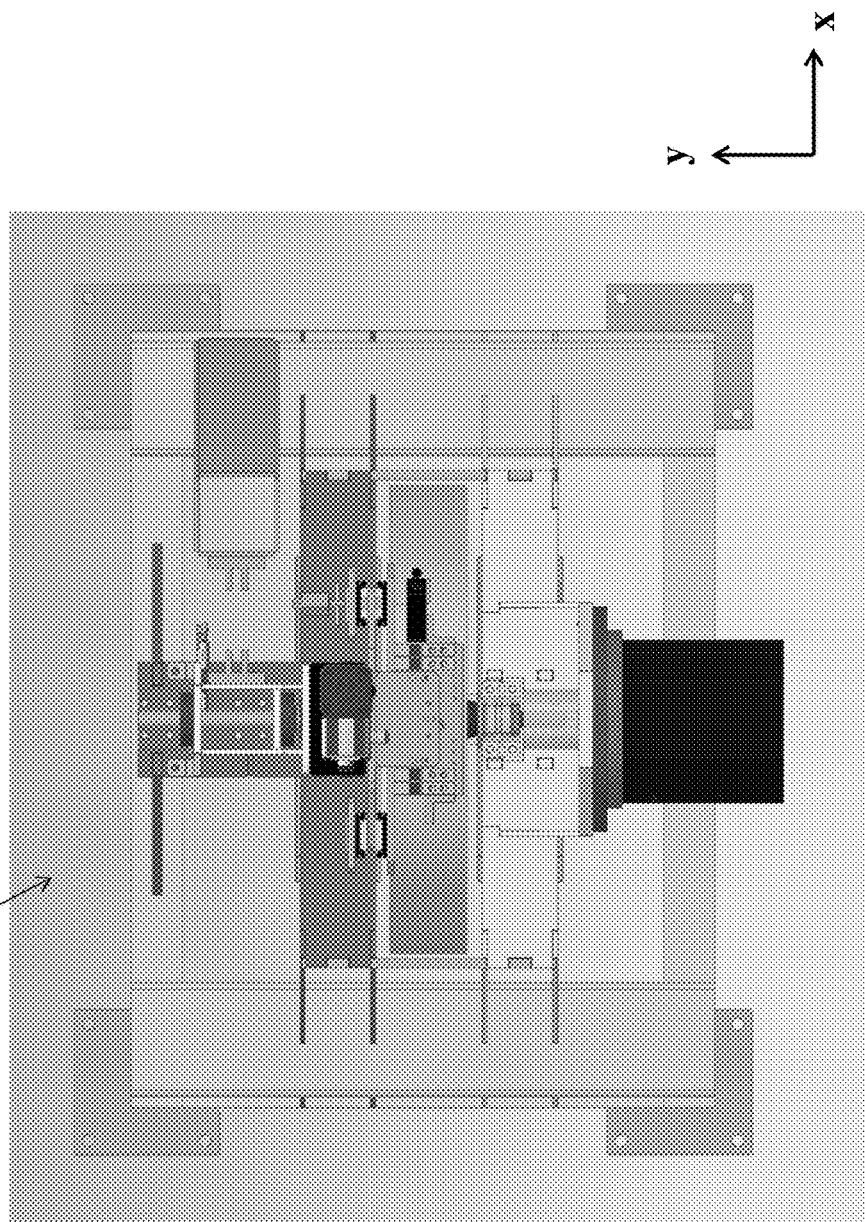
FIG. 11 shows a top view of the levitation rig shown in FIG. 9.
Figure 16:
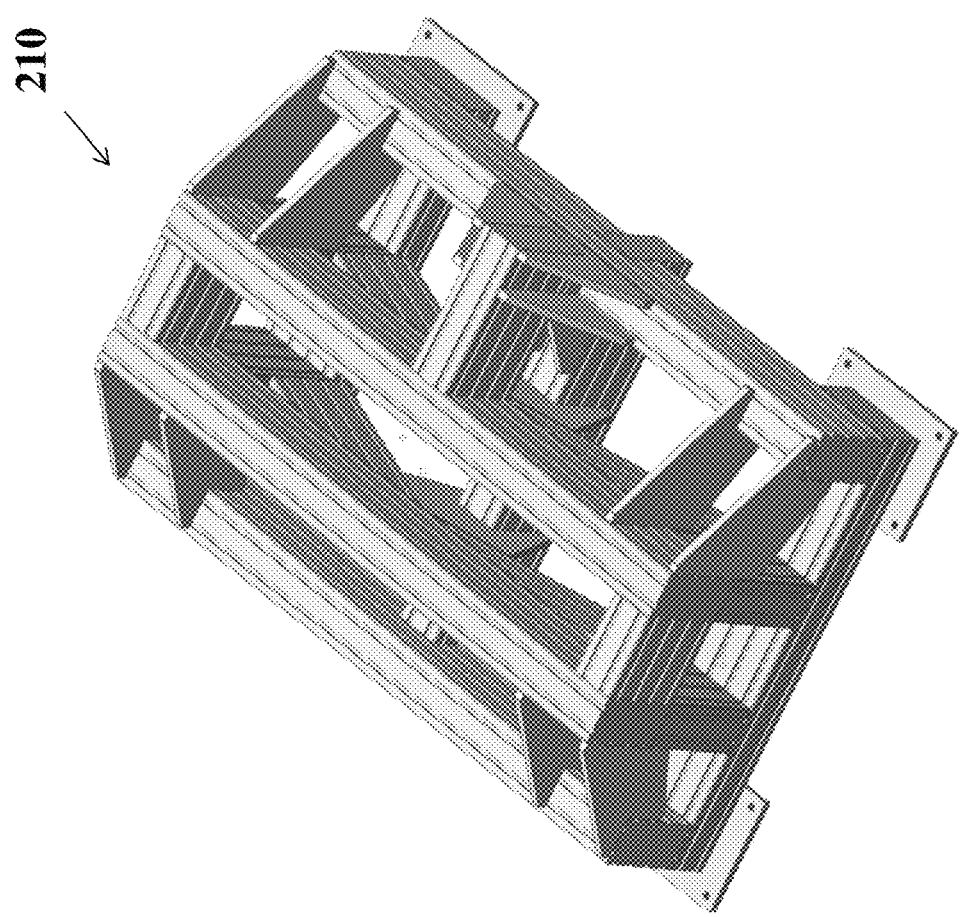
FIG. 16 shows an isometric view of a base of the levitation rig according to an aspect of the disclosure.
Figure 17:
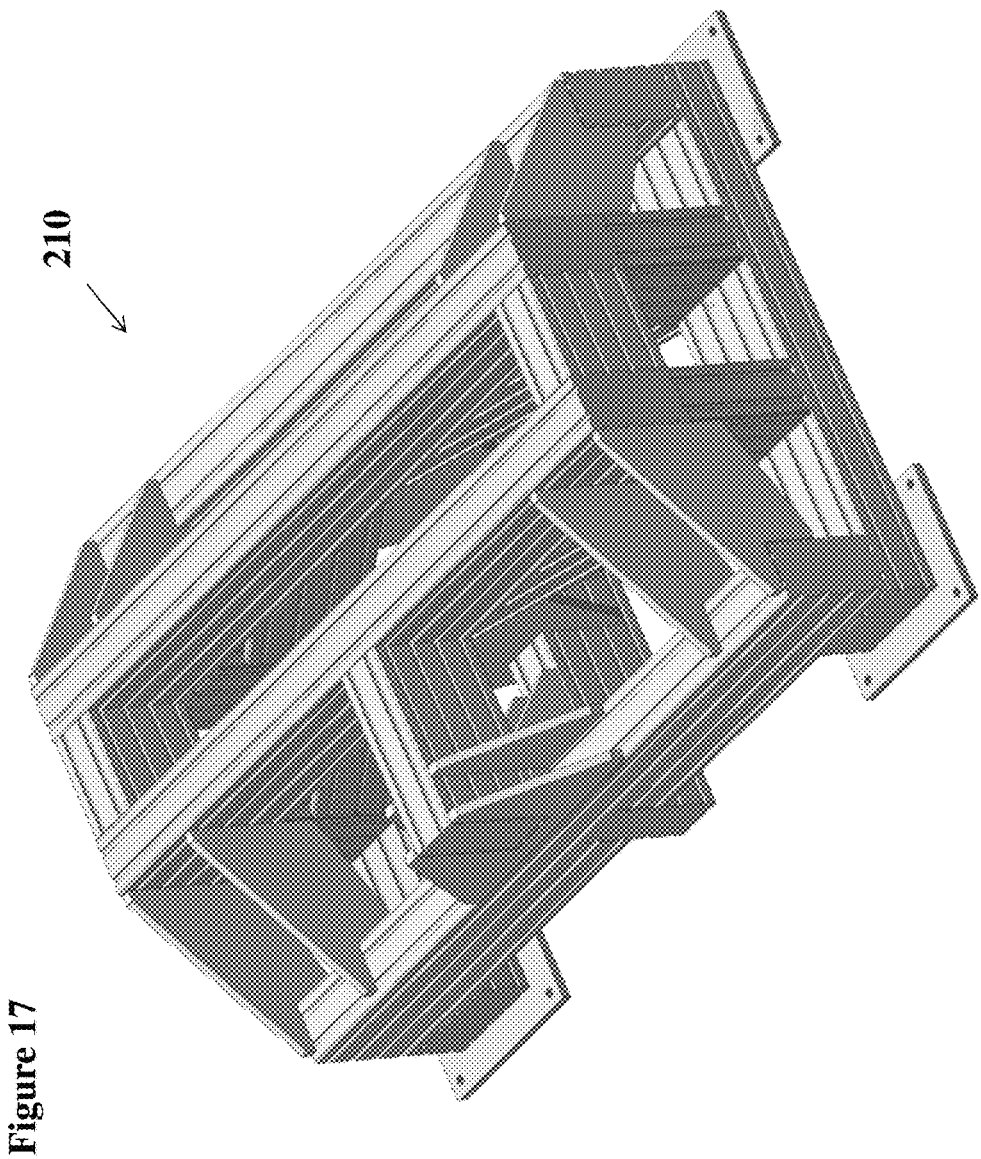
FIG. 17 shows another isometric view of a base of the levitation rig according to an aspect of the disclosure.

Referring now to FIGS. 9-15, views of an exemplary and non-limiting depiction of the levitation rig 200 disposed within the interior of the environmental chamber are illustrated. The levitation rig 200 may include a rotor 202. As shown in FIG. 10, the rotor 202 may include a rotor disc 204 mounted on a rotor shaft 206, and the levitation rig 200 may include a motor 208 configured to rotate the rotor disc 204 at speeds, for example, in excess of 10,000 revolutions per minute (r.p.m.) and to attain tangential surface speeds at a circumferential rotor surface 216 in excess of 300 meters per second (m/s). Since convective cooling capacity may be diminished at the predetermined pressure in the environmental chamber 100, the motor 208 may be water-cooled. As views of an exemplary and non-limiting depiction in FIGS. 15-17 demonstrate, the rotor 202 may be rotatably mounted to a base 210 of the levitation rig at a mount 212 of the base 210 that is connected to the rotor shaft 206.

In embodiments, the levitation rig 200 may include a first rotor for use with the air bearing and a second rotor for use with the magnetic levitation bearing. Each of the first and second rotor may be selectively connected to the base 210 of the levitation rig 200. The first rotor, the second rotor, or both may have magnetic properties. The rotor shaft 206 of the first rotor and the second rotor each may include a common shaft geometry, such that each rotor may be selectively connected to the mount 212 of the base 210.

Figure 19:
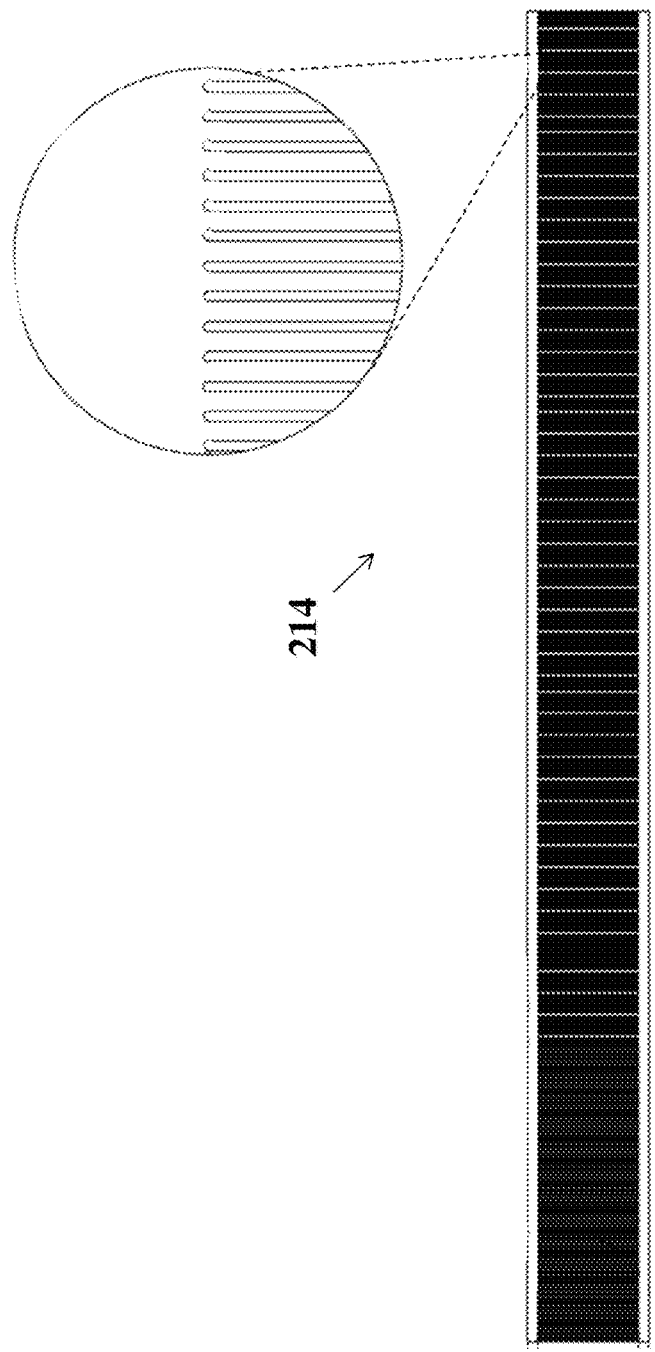
FIG. 19 shows a slotted surface foil of a composite rotor according to an aspect of the disclosure.

Referring now to FIGS. 18-19, views of an exemplary and non-limiting depiction of the rotor 202 are illustrated. The rotor 202 may be constituted of a single material or may be a composite material. In an embodiment of the rotor 202 that may be constituted of a composite material, the composite material may include a metal foil 214 (e.g. aluminum) spiral wound about a foam core with epoxy that defines a slotted circumferential surface of the rotor to provide testing conditions that replicate a slotted track. In embodiments, such as is depicted in FIG. 19, the metal foil 214 may be slotted such that a ratio of a width of the slots to a width of the metal foil 214 between the slots is 1:2, and the metal foil 214 (e.g. 1350-H18 AL) may be 0.5 mm thick. Kevlar, which according to an embodiment may be unidirectional Kevlar (e.g. 49 tow) 5 mm thick and may be spiral wound about the metal foil 214. Fiberglass, which according to an embodiment may be 4 plies of 0/90 s-glass 5.01 oz./yd.$^2$ fabric plain weave, may be wet-laid over the top of the spiral wound Kevlar and may be darted to wrap around face sheets of the foam core such that the darting is evenly spaced and no darting overlaps with each other.

The rotor disc 204 may be configured to rotate with the rotor shaft 206 extending in the y-direction, as shown in the exemplary embodiment of FIG. 10. The rotor disc 204 may rotate in a clockwise or a counter clockwise direction with the rotor shaft 206. The rotor disc 204 includes the circumferential rotor surface 216 that defines an outer circumference of the rotor disc 204. The circumferential rotor surface 216 may be a substantially smooth surface to within 0.0002 of an inch.

The levitation rig 200 may include a sensor 300 disposed within the interior of the environmental chamber 100 and configured to measure a testing characteristic, or a plurality of testing characteristics, of an object disposed within the environmental chamber 100 as the object interacts with the rotor 202. In embodiments, the sensor 300 may be a pitot tube 302, a load cell 304, pressure transducers 306, an infrared camera 308, any combination thereof, or any other instrument or combination of instruments capable of measuring and/or quantifying any of the plurality of testing characteristics. It is contemplated that the sensor 300 may be used to measure one or a plurality of testing characteristics within the environmental chamber 100, including but not limited to lift, drag, temperature, pressure, flow speed, or the like.

Figure 14:
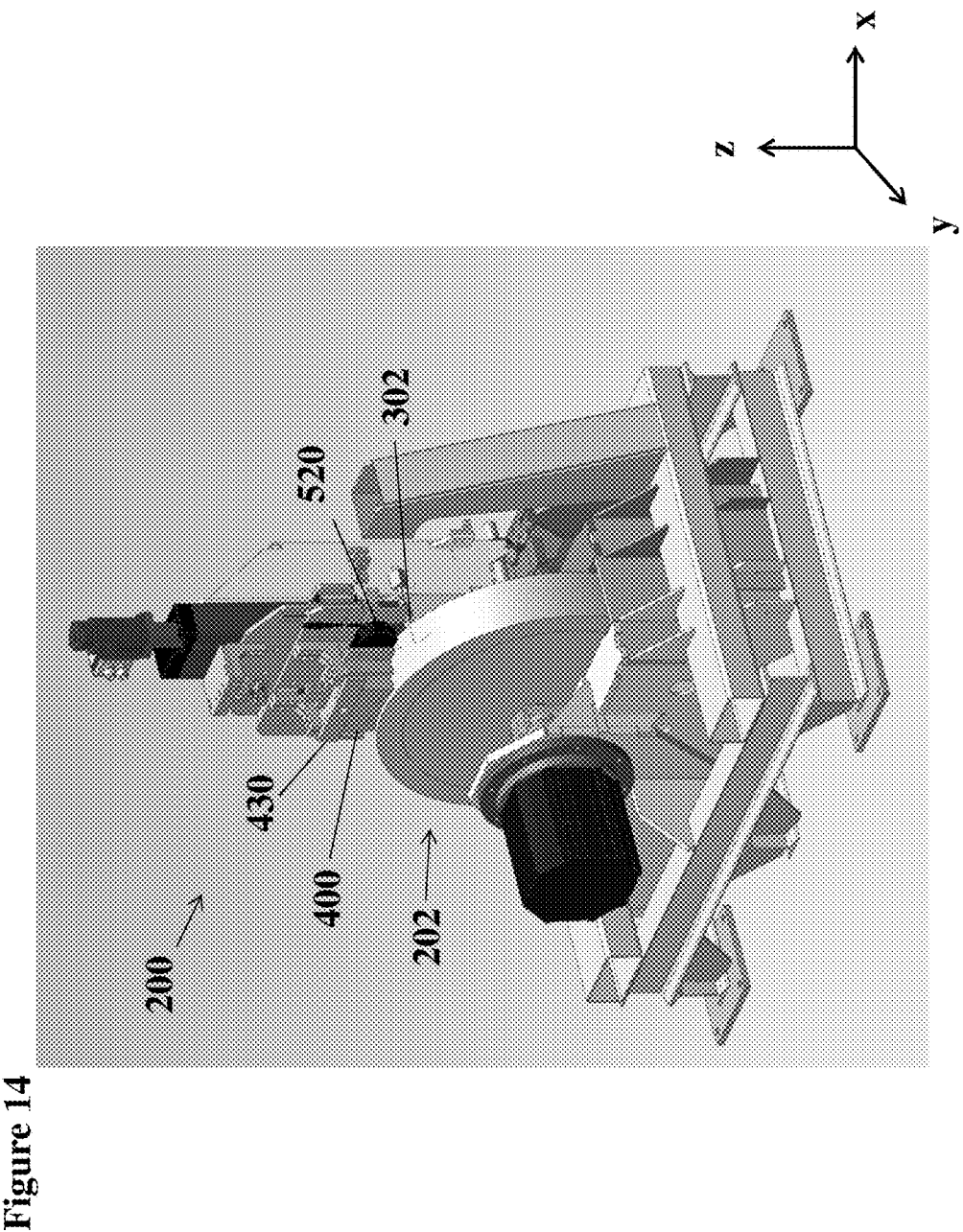
FIG. 14 shows an isometric view of the levitation rig shown in FIG. 9.
Figure 15:
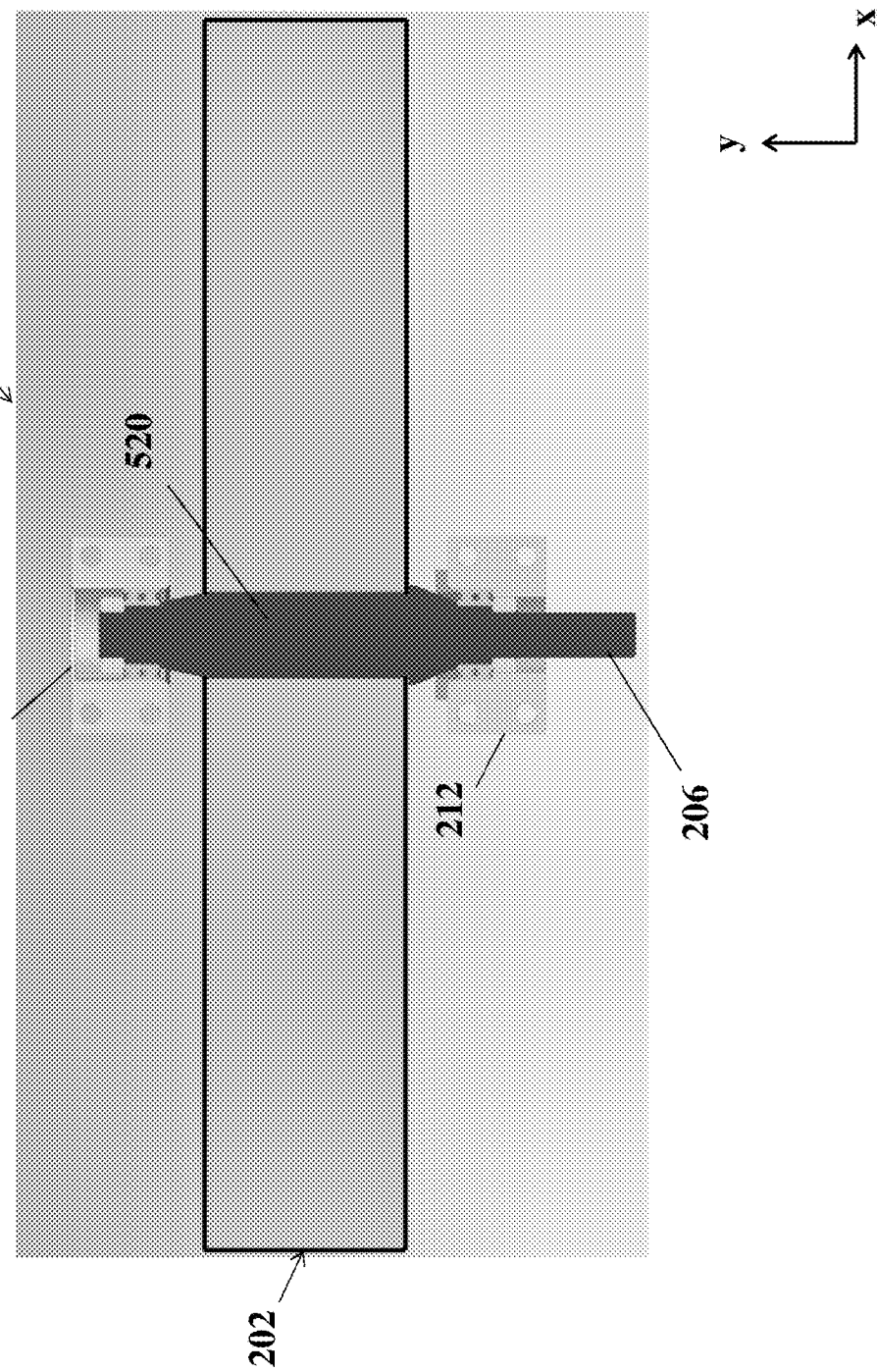
FIG. 15 shows a top view of the rotor of the according to an aspect of the disclosure.
Figure 20:
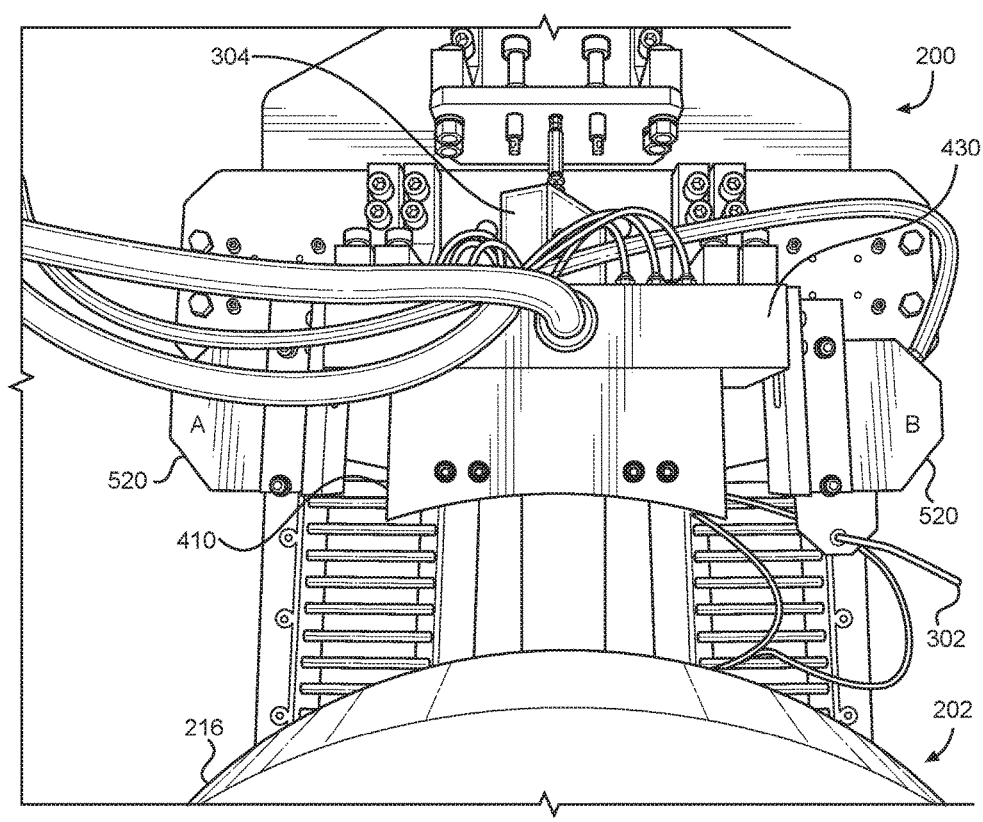
FIG. 20 shows magnified front view of the levitation rig having an air bearing according to an aspect of the disclosure.

Referring now to FIGS. 9, 14, and 20, views of an exemplary and non-limiting depiction of the sensor 300 including at least one pitot tube 302 are illustrated. The at least at least one pitot tube 302 may characterize a flow a speed of a low pressure fluid, such as air, disposed in the environmental chamber 100.

Referring now to FIGS. 9, 10, 12, 14, and 20, views of an exemplary and non-limiting depiction of the sensor 300 including a load cell 304 are illustrated. In embodiments, the sensor 300 includes a load cell 304 that measures lift and drag of a bearing 400 (described below) during the test.

Figure 25:
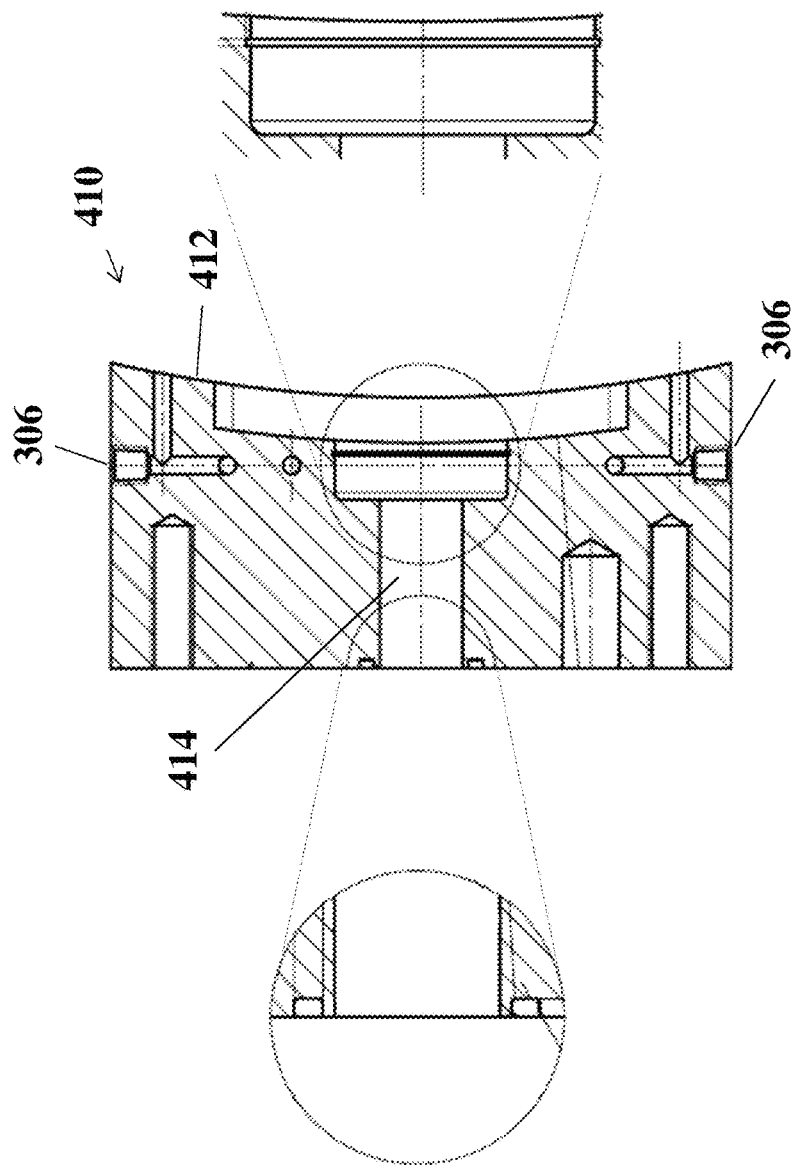
FIG. 25 shows a section view along the sectional line C-C of the air bearing shown in FIG. 24.
Figure 26B:
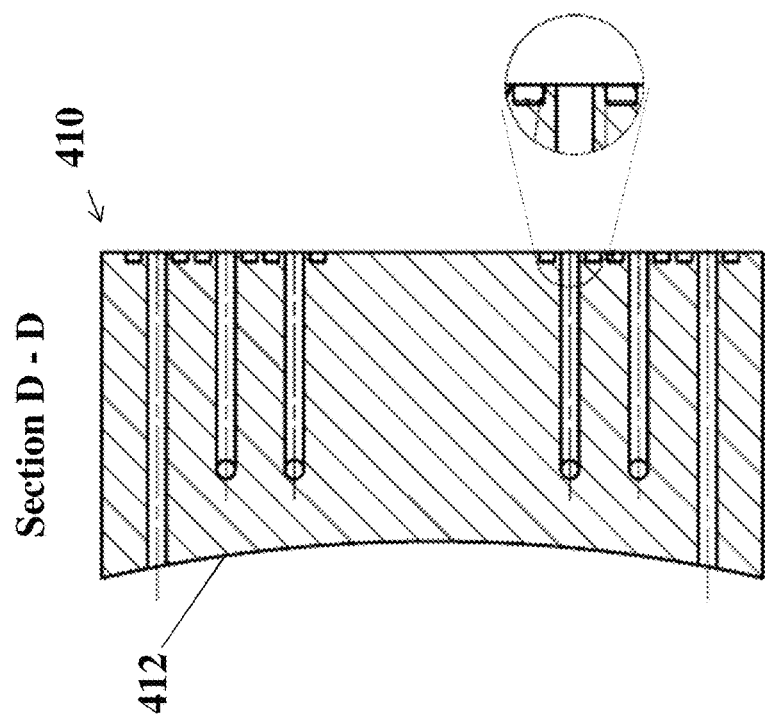
FIG. 26B shows a section view along the sectional line D-D of the air bearing shown in FIG. 26A.
Figure 26A:
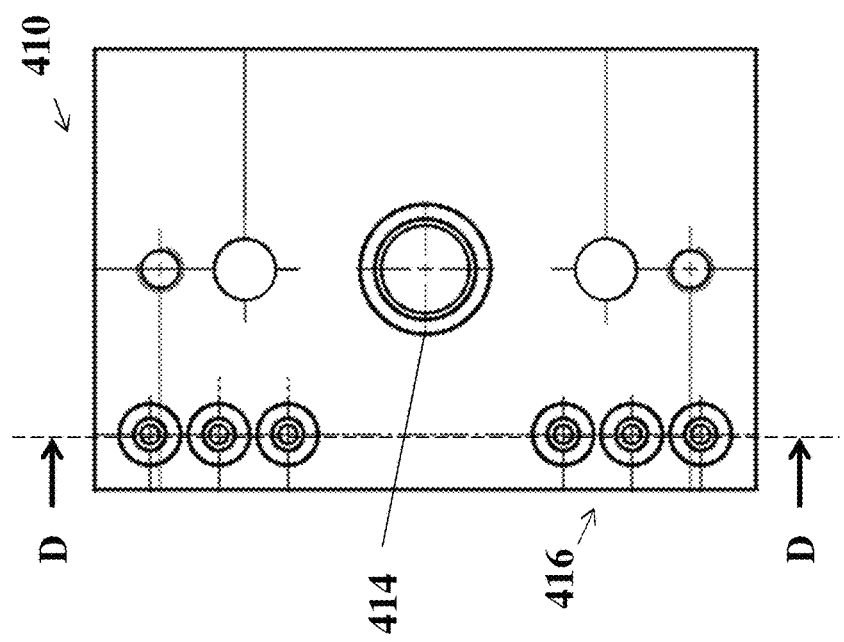
FIG. 26A shows a top view of the air bearing shown in FIG. 23A.
Figure 27D:
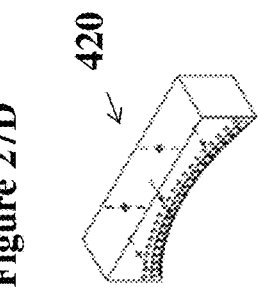
FIGS. 27A, 27B, 27C, and 27D respectively show a rear, a top, a front, and a isometric view of a magnetic levitation bearing according to an aspect of the disclosure.
Figure 27A:
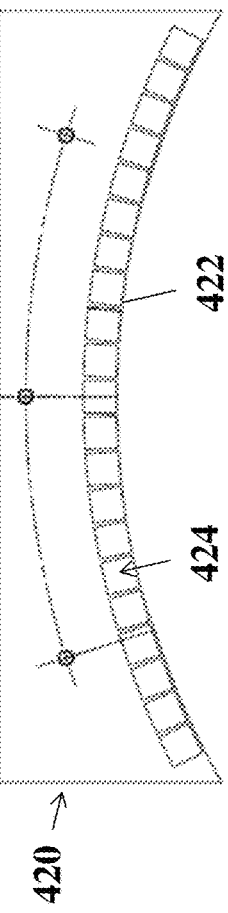
Figure 27B:
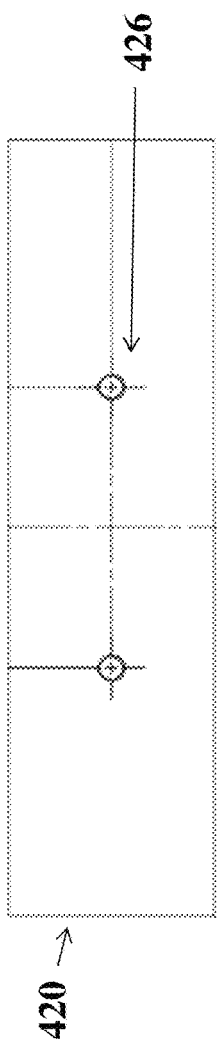
Figure 27C:
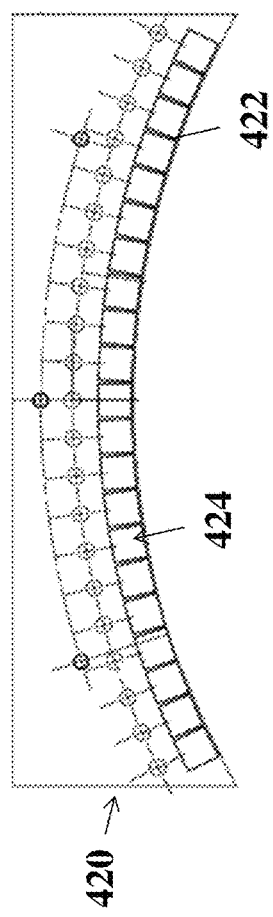

Referring now to FIG. 25, views of an exemplary and non-limiting depiction of the sensor including pressure transducers 306 are illustrated. The pressure transducers 306 may measure pressure variation during an active test, e.g., when the levitation rig 200 operates.

Referring now to FIG. 2, a view of an exemplary and schematic depiction of the sensor 300 including an infrared camera 308 is illustrated. The infrared camera 308 may be a forward looking infrared camera (FILR camera) and may be disposed on the door 104 of the environmental chamber 100. In the low-pressure environment of the environmental chamber 100 during the test, convective cooling is diminished. Accordingly, the FUR camera is provided to monitor the levitation rig 200 to measure hot spots of the levitation rig 200 during a test using the testing apparatus 1, and to determine whether the hot spots are of sufficient magnitude to, for example, require a shutdown or modification of the test. The infrared camera 308 may be provided in an atmospheric chamber such that the infrared camera 308 may operate within the environmental chamber 100 in an environment that differs from the environment of the environmental chamber 100. For example, the atmospheric chamber may be at a different pressure, temperature, humidity, the like, or any combination thereof than exits within the environmental chamber 100. An umbilical may be provided from the atmospheric chamber to allow data measured by the infrared camera 308 within the atmospheric chamber to be transmitted to a system controller 3800 (described below).

The testing apparatus 1 may be configured to receive, within the interior of the environmental chamber 100, the object that interacts with the least one rotor 202 while the testing apparatus 1 is performing a test. As at least is depicted in the exemplary and non-limiting aspect shown in FIGS. 9, 10, 12-14, the object may be a bearing 400, and the bearing 400 may be an air bearing 410 or a magnetic levitation bearing 420. The bearing 400 may be configured for use in a high speed, high efficiency transportation system utilizing a low-pressure environment in order to reduce drag on a vehicle at high operation speeds, such as one of the air bearings discussed in commonly-assigned U.S. application Ser. No. 15/007,783, entitled "TRANSPORTATION SYSTEM," filed on Jan. 27, 2016, the entire contents of which are expressly incorporated by reference herein.

Figure 21:
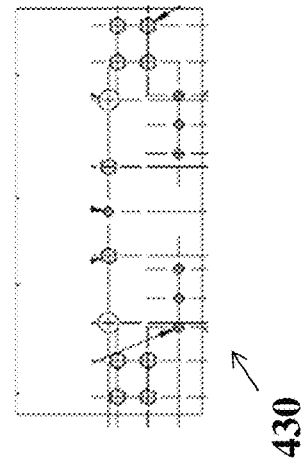
FIGS. 21A, 21B, and 21C respectively show an isometric, a top, and a bottom view of a manifold according to an aspect of the disclosure.
Figure 21:
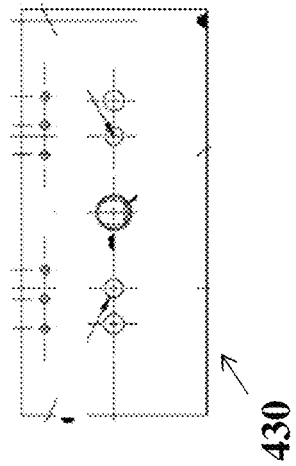
Figure 21:
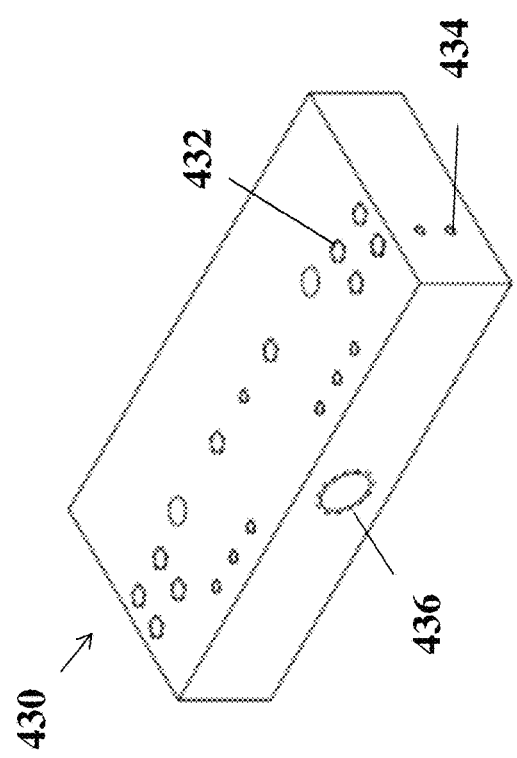

The bearing 400 may be attached to a manifold 430. Referring now to FIGS. 21 and 22, views of an exemplary and non-limiting depiction of the manifold 430 are illustrated. The manifold 430 may include at least one connector 432, at least one sensor port 434, and at least one fluid input port 436. The manifold 430 may be configured to selectively receive both the air bearing 410 and the magnetic levitation bearing 420. As shown in FIG. 9, the manifold 430 may be attached to an intermediate plate 440 that may be fixed to a linear actuator 510 (described later). The intermediate plate 440 may also be attached to the load cell 304.

Figure 23A:
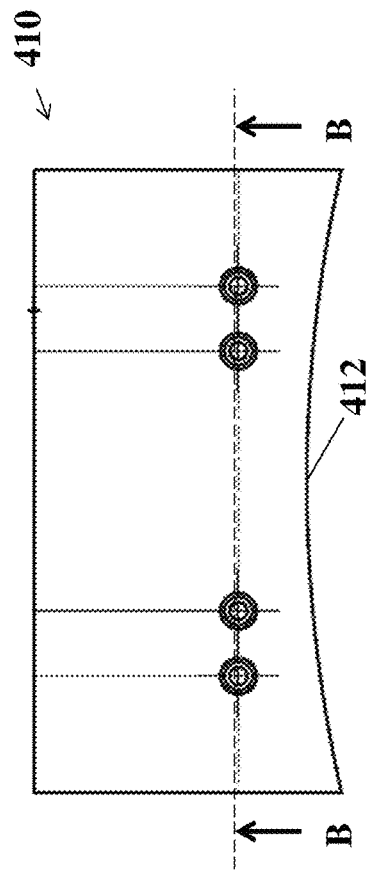
FIG. 23A shows a front view of an air bearing according to an aspect of the disclosure.
Figure 23B:
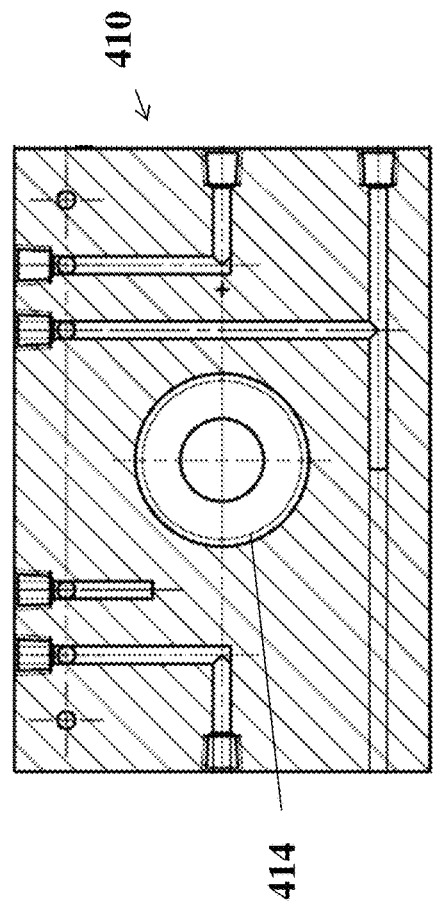
FIG. 23B shows a sectional view along the sectional line B-B of the air bearing shown in FIG. 23A.

Referring now to FIGS. 20 and 23-26, views of an exemplary and non-limiting depiction of the air bearing 410 are illustrated. As shown in FIG. 23, the air bearing 410 may include a bottom circumferential surface 412, a fluid passage 414, the pressure transducers 306 and a plurality of attachment holes 416 for attaching the air bearing 410 to the manifold 430 (see FIG. 20). When the testing apparatus 1 performs a test, the air bearing 410 may utilize a thin film of pressurized gas, such as air, that enters through the at least one fluid input port 436 of the manifold 430 and travels through and out of the fluid passage 414 to provide a low-friction load-bearing interface that defines a gap G (see FIG. 10) between the bottom circumferential surface 412 of the air bearing 410 and the circumferential rotor surface 216. It should be understood that the air bearing 410 is not limited to utilizing air as the pressurized gas, as any suitable pressurized gas may be utilized to provide the low friction load-bearing interface.

Figure 28:
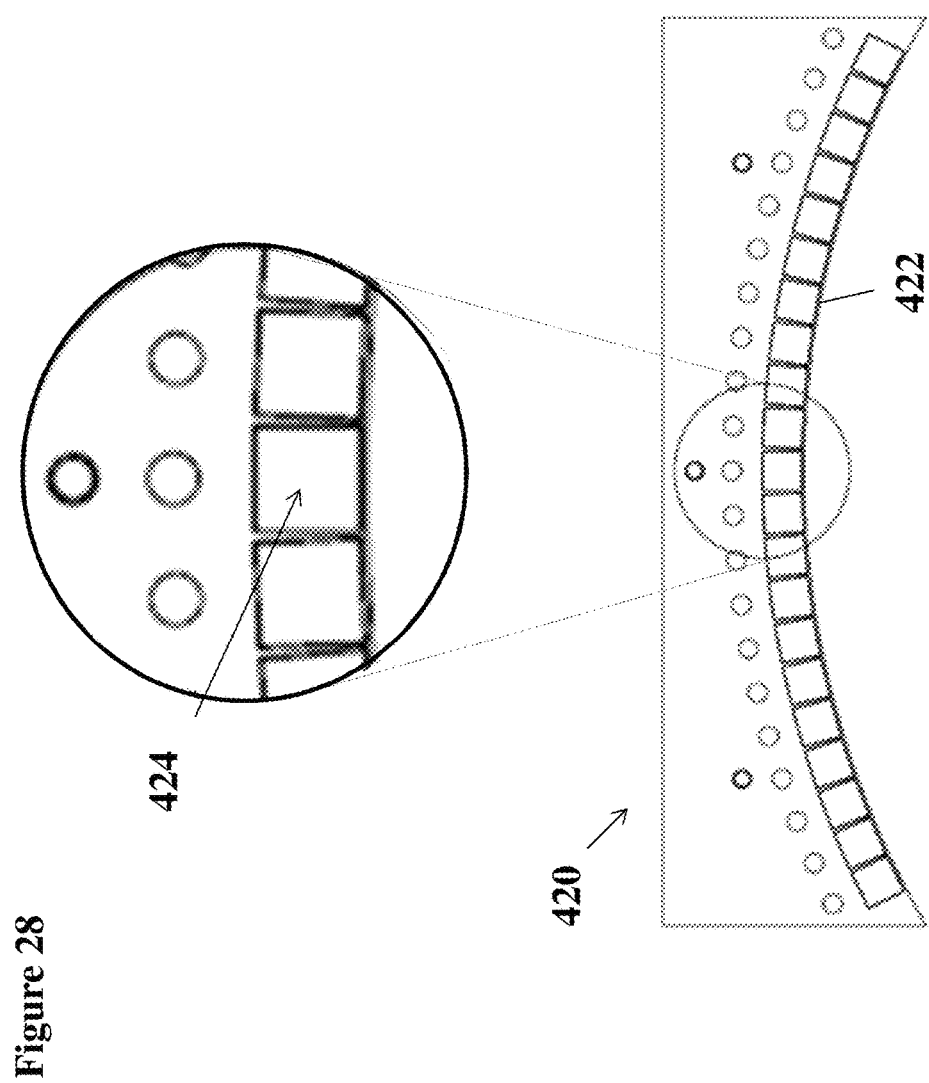
FIG. 28 shows another front view of the magnetic levitation bearing according to FIGS. 27A, 27B, 27C, and 27D.

Referring now to FIGS. 27 and 28, views of an exemplary and non-limiting depiction of the magnetic levitation bearing 420 are illustrated. The magnetic levitation bearing 420 may include a bottom circumferential surface 422, a plurality of magnetic chambers 424 having magnets disposed therein, and a plurality of attachment holes 426 for attaching the magnetic levitation bearing 420 to the manifold (not shown). When the testing apparatus 1 performs a test, a magnetic repulsion force between the magnetic levitation bearing 420 and the circumferential rotor surface 216—the rotor 202 having magnetic properties that along with the magnets of the magnetic levitation bearing 420 provide the magnetic repulsion force—may provide a low friction load-bearing interface that defines a gap G' (see FIG. 10) between the bottom circumferential surface 422 of the magnetic levitation bearing 420 and the circumferential rotor surface 216.

The respective bottom circumferential surfaces 412, 422 of the air bearing 410 and the magnetic levitation bearing 420 are each defined such that when the respective gap G, G' is a predetermined nominal ride height, a diameter of the respective bottom circumferential surface 412, 422 of the air bearing 410 and the magnetic levitation bearing 420 is concentric with a diameter of the circumferential rotor surface 216 of the rotor 202.

As shown in FIG. 9, the levitation rig 200 may include a laser feedback mechanism 500. The laser feedback mechanism 500 may include the linear actuator 510, linear rails 512, and a back plate 514 that may connect the linear actuator 510 to the intermediate plate 440 such that the bearing 400 connected to the intermediate plate 440 is movable with a movement of the linear actuator 510. The laser feedback mechanism 500 may also include at least one laser 520 that may be fixed to the levitation rig 200. In some embodiments, the at least one laser 520 may be fixed to the intermediate plate 440.

Figure 12:
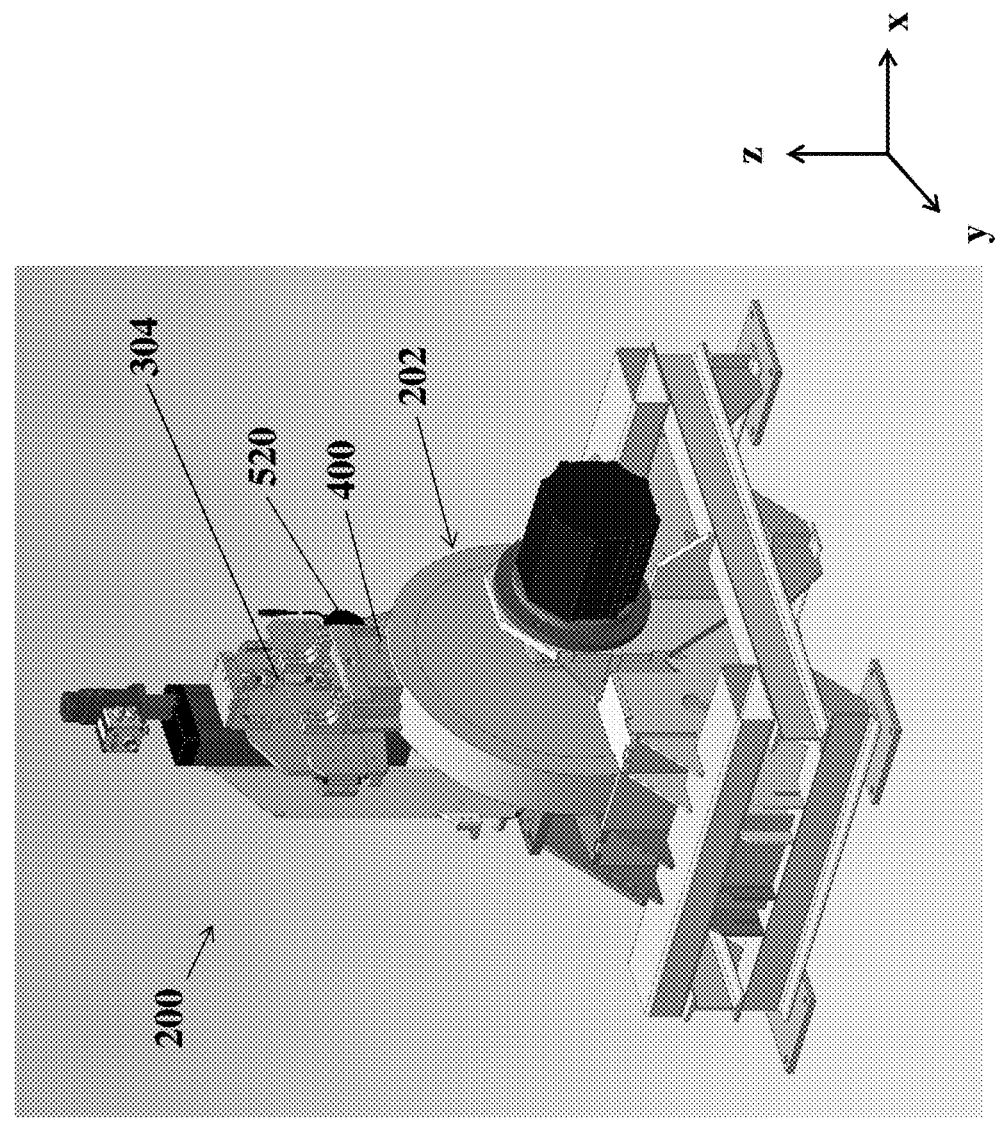
FIG. 12 shows an isometric view of the levitation rig shown in FIG. 9.
Figure 13:
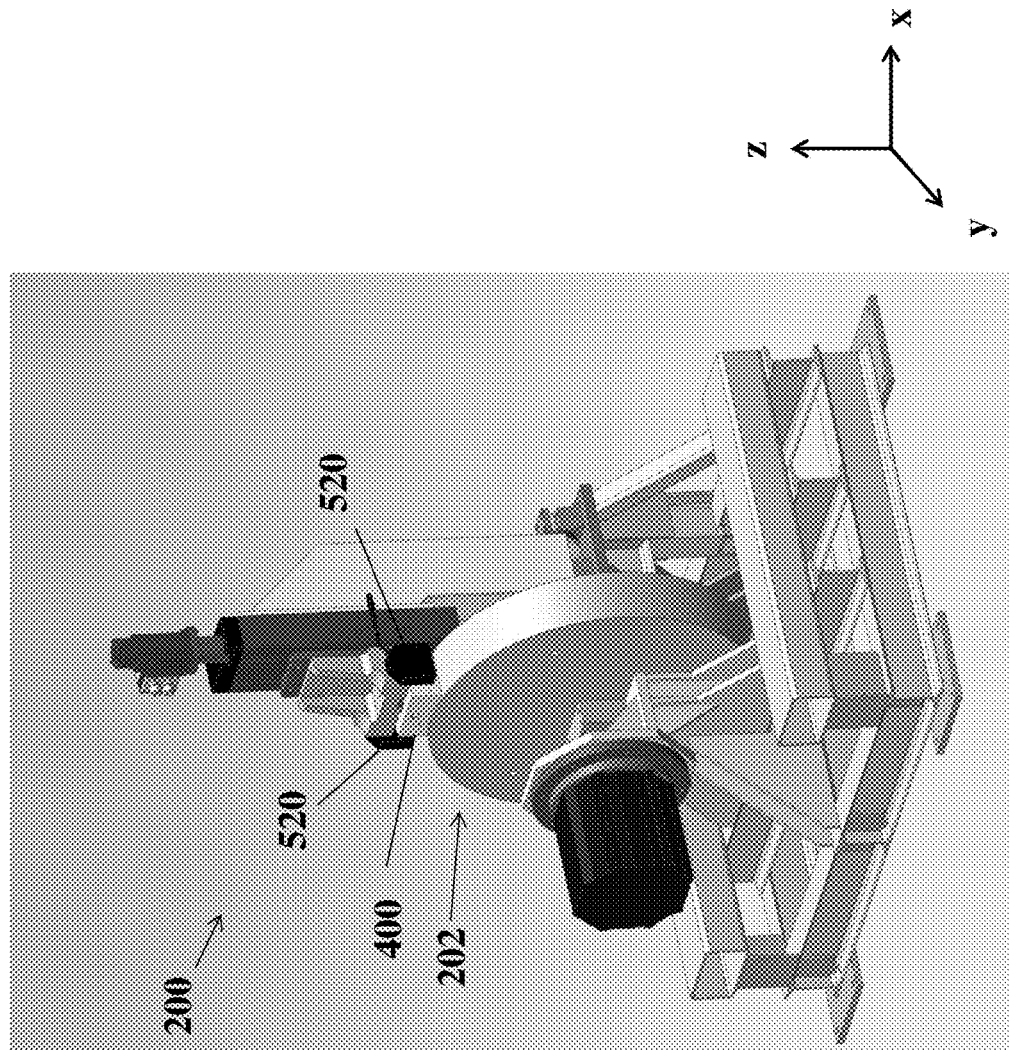
FIG. 13 shows an isometric view of an embodiment of the levitation rig of the testing apparatus shown in FIG. 1.

As shown in the exemplary and non-limiting embodiment of FIG. 20, the laser feedback mechanism may include two or more lasers 520 arranged about the levitation rig 200 above the rotor 202. As shown in FIG. 12, the lasers 520 may be configured to provide feedback to the system controller 3800 (described below) regarding a position of the rotor 202 as it expands due thermal expansion caused by forces, including but not limited to centripetal force, acting on the rotor 202 during the test. In embodiments, the lasers 520 may be configured to measure a dimension of at least one of the bearing 400 and the rotor 202. The dimension may include any of a position of the bearing 400, a position of rotor 202, a physical dimension of the bearing 400 or the rotor 202, including but not limited to a thickness the bearing 400 or the rotor 202, or the like. As shown in FIG. 9, the linear actuator 510 may be configured to adjust a position of the bearing 400, relative to the circumferential rotor surface 216, to precisely maintain the gap G, G' between the respective bottom circumferential surface 412, 422 of the air bearing 410 (or the magnetic levitation bearing 420) and the circumferential rotor surface 216 during the test. Precise maintenance of the gap G, G' may improve the effectiveness of the bearing 400 and the quality of test data. The linear actuator 510 may maintain the gap G, G' based upon feedback of the position of the rotor disc 204 provided by the one or more lasers 520 in the laser feedback mechanism 500. In an exemplary embodiment during a test, the gap G, G' may be maintained at 10 microns.

The testing apparatus 1 may also include the system controller 3800. The system controller 3800 may be used to control, either individually or in any combination, the pressure setting system, the rotor 202, the sensor 300, the bearing 400, the laser feedback mechanism 500, the linear actuator 510, any seals that seal the environmental chamber 100, or any other aspects of the testing apparatus 1.

Figure 29:
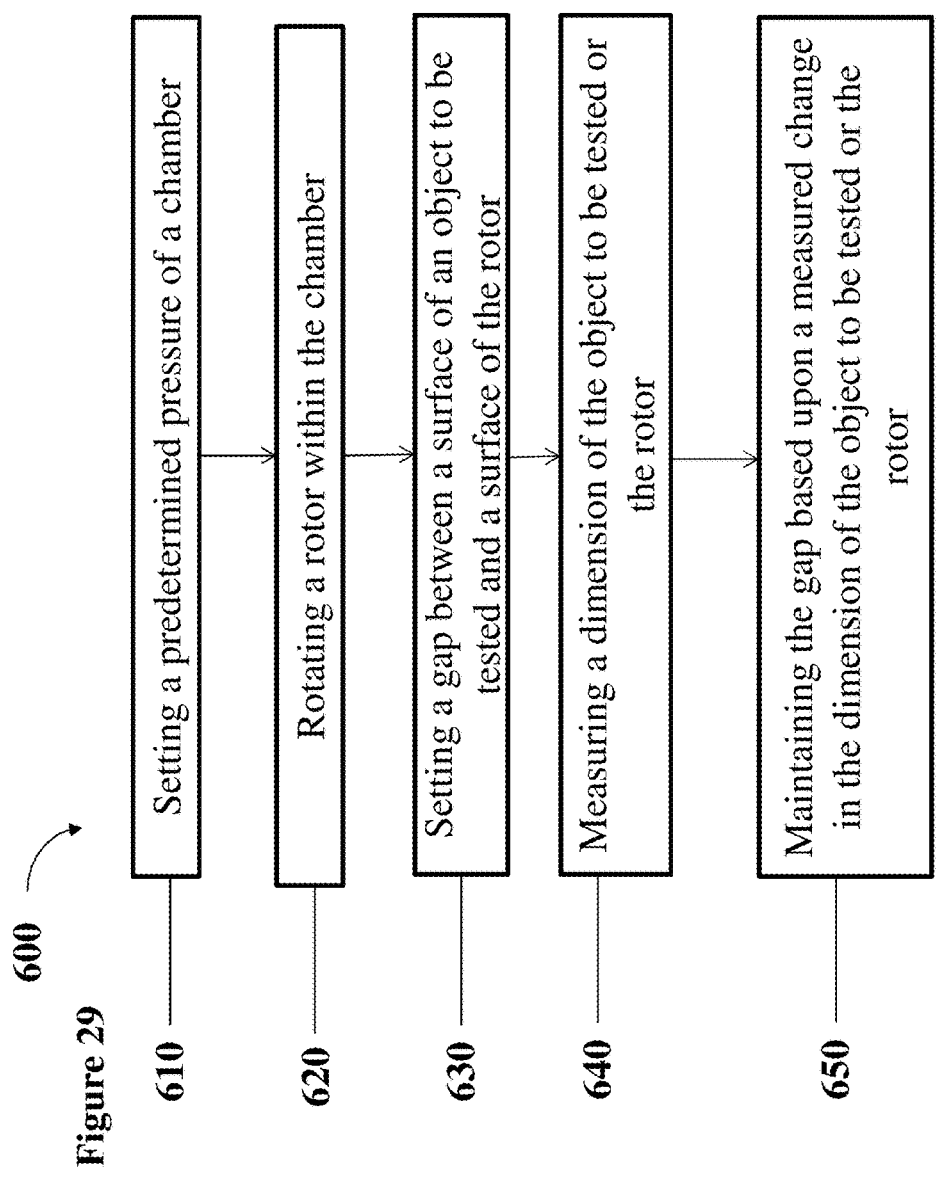
FIG. 29 shows an exemplary method in accordance with the embodiments described herein.

Referring to FIG. 29, another aspect of the present disclosure includes a method 600 of maintaining the gap between the respective bottom circumferential surface of the air bearing and the magnetic levitation bearing and the circumferential rotor surface disposed within the environmental chamber while the interior of the environmental chamber is maintained at a predetermined pressure. As shown in FIG. 29, at step 610, the pressure of the interior of the environmental chamber is set. In embodiments, the predetermined pressure may be set at a pressure lower than 1 atmosphere. In other embodiments, the predetermined pressure may be set at less than 0.001 atmosphere. In still other embodiments, the predetermined pressure may approach a vacuum pressure. In embodiments, the predetermined pressure may be a pressure between 0.001 atmosphere and 1 atmosphere. In embodiments, the predetermined pressure may be a pressure between 0.006 atmosphere and 0.018 atmosphere. It is also noted that while the set pressure described herein maintains a pressure of less than 1 atmosphere, it is contemplated that the method can be used in other applications, including but not limited to environments in which the interior of the environmental chamber 100 is set at, or above atmospheric pressure.

At step 620, the rotor disc of the rotor is rotated. The method may include spinning the rotor disc at speeds in excess of 10,000 revolutions per minute (r.p.m.) and attaining tangential speeds in excess of 300 meters per second (m/s).

At step 630, the gap between the bottom circumferential surface of the air bearing (or the magnetic levitation bearing) and the circumferential rotor surface is set.

At step 640, a dimension of at least one of the bearing and the rotor is measured using the laser. The dimension may include any of a position of the bearing, a position of the rotor, a physical dimension of the bearing or the rotor, including but not limited to a thickness the bearing or the rotor, or the like. The laser may measure the dimension via triangulation, interferometry, or any other method readily understood to those skilled in the art.

At step 650, the gap between the respective bottom circumferential surface of the air bearing and the magnetic levitation bearing and the circumferential rotor surface is maintained by adjusting, with the linear actuator, at least one of the bearing and the rotor based upon a change, as measured by the at least one laser, in the dimension of at least one of the bearing and the rotor.

Figure 30:
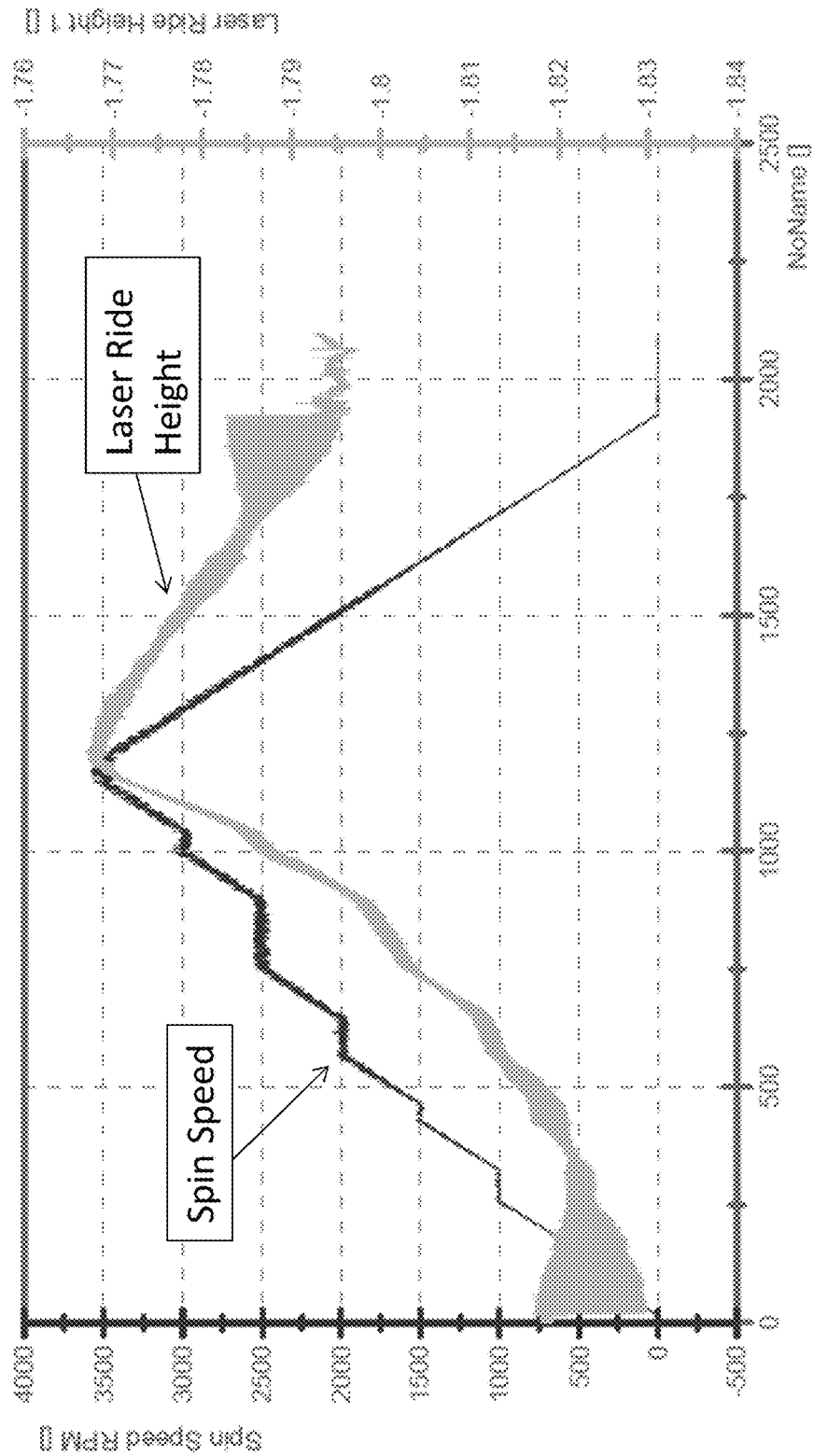
FIG. 30 shows exemplary test data produced from a testing apparatus according to an aspect of the disclosure.

Referring to FIG. 30, exemplary data recovered form a test of the testing apparatus 1 is shown.

As will be appreciated by one skilled in the art, aspects of the present disclosure, such as the system controller 3800 and the method 600, may be embodied as a system, a method or a computer program product. Accordingly, embodiments of the present disclosure may take the form of an entirely hardware embodiment, or an embodiment combining software and hardware aspects that may all generally be referred to herein as a "circuit," "module" or "system." Furthermore, aspects of the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet,
a magnetic storage device
a USB key,
a certificate,
a perforated card, and/or
a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present disclosure may be embodied in a field programmable gate array (FPGA).

Figure 31:
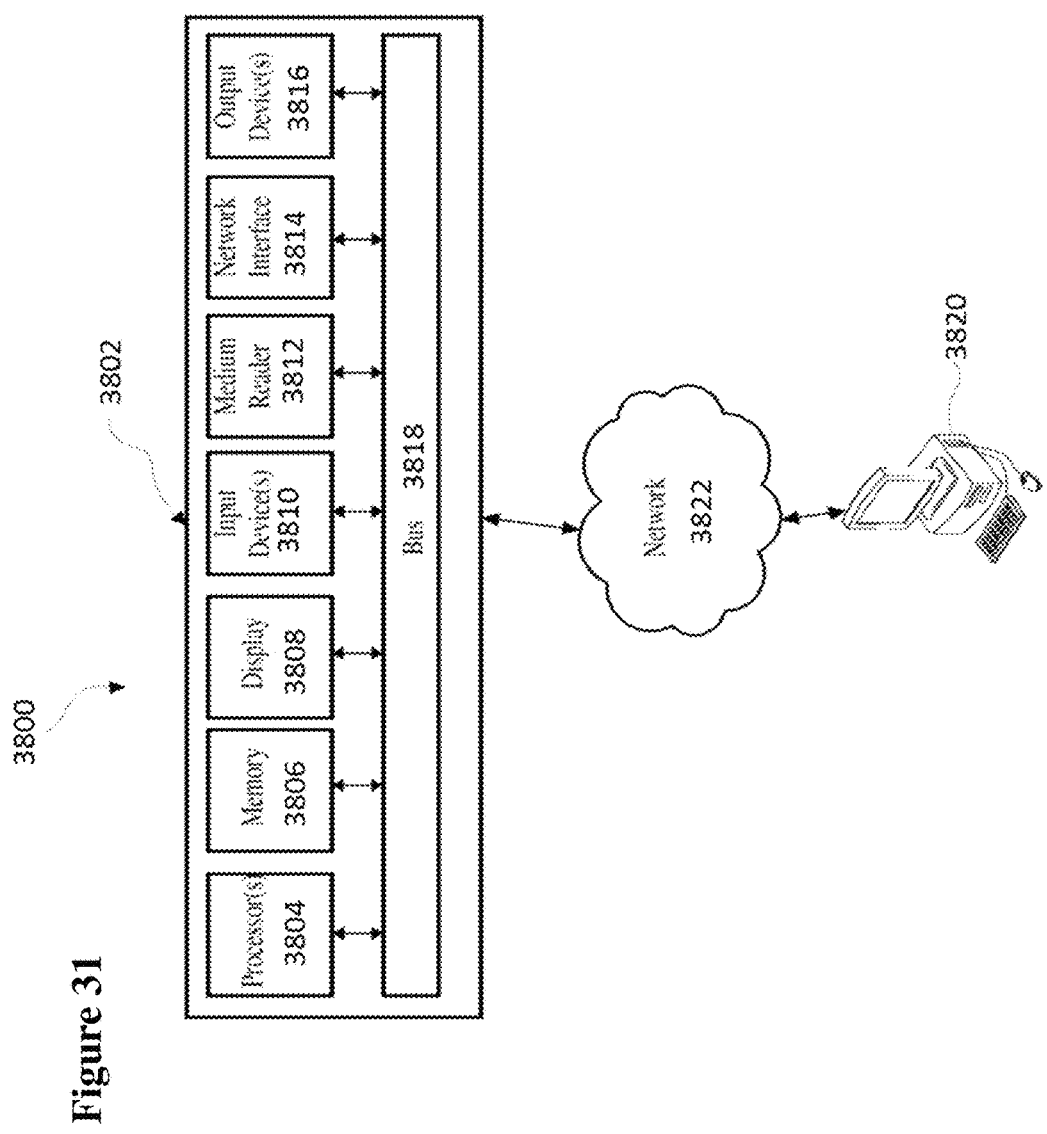
FIG. 31 shows an exemplary system for use in accordance with the embodiments described herein.

FIG. 31 is an exemplary system for use in accordance with the embodiments described herein. The system controller 3800 may be a computer system 3802. The computer system 3802 may operate as a standalone device or may be connected to other systems or peripheral devices. For example, the computer system 3802 may include, or be included within, any one or more computers, servers, systems, communication networks or cloud environment.

The computer system 3802 may operate in the capacity of a server in a network environment, or in the capacity of a client user computer in the network environment. The computer system 3802, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3802 is illustrated, additional embodiments may include any collection of systems or sub-systems that individually or jointly execute instructions or perform functions.

As illustrated in FIG. 31, the computer system 3802 may include at least one processor 3804, such as, for example, a central processing unit, a graphics processing unit, or both. The computer system 3802 may also include a computer memory 3806. The computer memory 3806 may include a static memory, a dynamic memory, or both. The computer memory 3806 may additionally or alternatively include a hard disk, random access memory, a cache, or any combination thereof. Of course, those skilled in the art appreciate that the computer memory 3806 may comprise any combination of known memories or a single storage.

As shown in FIG. 31, the computer system 3802 may include a computer display 3808, such as a liquid crystal display, an organic light emitting diode, a flat panel display, a solid state display, a cathode ray tube, a plasma display, or any other known display. The computer system 3802 may include at least one computer input device 3810, such as a keyboard, a remote control device having a wireless keypad, a sensor, a microphone coupled to a speech recognition engine, a camera such as a video camera or still camera, a cursor control device, or any combination thereof. Those skilled in the art appreciate that various embodiments of the computer system 3802 may include multiple input devices 3810. Moreover, those skilled in the art further appreciate that the above-listed, exemplary input devices 3810 are not meant to be exhaustive and that the computer system 3802 may include any additional, or alternative, input devices 3810.

The computer system 3802 may also include a medium reader 3812 and a network interface 3814. Furthermore, the computer system 3802 may include any additional devices, components, parts, peripherals, hardware, software or any combination thereof which are commonly known and understood as being included with or within a computer system, such as, but not limited to, an output device 3816. The output device 3816 may be, but is not limited to, a speaker, an audio out, a video out, a remote control output, or any combination thereof.

Aspects of embodiments of the present disclosure can be implemented by special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc.

Furthermore, the aspects of the disclosure may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, servers, methods, media, and programs. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the disclosure are not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

What is claimed is:

1. A testing apparatus comprising:
   a sealable chamber having an interior environment maintained at a predetermined pressure;
   a rotor disposed within the interior environment of the chamber and configured to rotate within the chamber;
   an object disposed within the interior environment of the chamber that is configured to interact with the rotor; and
   at least one sensor disposed within the interior of the chamber, wherein
   when the rotor rotates, the at least one sensor is configured to measure a testing characteristic as the object interacts with the rotating rotor, wherein
   the object is one of an air bearing and a magnetic levitation bearing, and
   the one of the air bearing and the magnetic levitation bearing is configured to provide a load-bearing interface between a surface of the one of the air bearing and the magnetic levitation bearing and a surface of the rotor.

2. The testing apparatus of claim 1, wherein the rotor is configured to rotate to achieve a surface speed that exceeds 300 meters per second.

3. The testing apparatus of claim 1, wherein the predetermined pressure of the interior environment is between 0.006 atmosphere and 0.018 atmosphere, and
   the rotor is configured to rotate so as to achieve a surface speed that exceeds 300 meters per second.

4. The testing apparatus of claim 1, wherein the testing characteristic is at least one of lift, drag, temperature, pressure, and flow speed.

5. The testing apparatus of claim 1, wherein the rotor includes a slotted circumferential surface.

6. The testing apparatus of claim 1, wherein the sealable chamber comprises a cylindrical pressure vessel.

7. The testing apparatus of claim 1, wherein a diameter of the surface of the one of the air bearing and the magnetic levitation bearing is concentric with a diameter of the surface of the rotor.

8. The testing apparatus of claim 1, wherein the at least one sensor is configured to measure the testing characteristic of the object as the object interacts with the rotating rotor.

9. The testing apparatus of claim 1, wherein the predetermined pressure of the interior environment is lower than 1 atmosphere.

10. The testing apparatus of claim 9, wherein the predetermined pressure of the interior environment is greater than 0.001 atmosphere.

11. The testing apparatus of claim 1, wherein
    the object is the air bearing, and
    the load-bearing interface is provided by a film of pressurized gas that defines a gap between the surface of the air bearing and the surface of the rotor.

12. The testing apparatus of claim 11, further comprising:
    a laser feedback mechanism, including:
        an actuator configured to adjust a size of the gap between the surface of the air bearing and the surface of the rotor;
        at least one laser configured to measure a dimension of at least one of the air bearing and the rotor; and
        a controller configured to control the actuator based upon a change in the dimension measured by the laser.

13. The testing apparatus of claim 1, wherein
    the object is the magnetic levitation bearing, and
    the load-bearing interface is provided by a magnetic repulsion force that defines a gap between the magnetic levitation bearing and the surface of the rotor.

14. The testing apparatus of claim 13, further comprising:
    a laser feedback mechanism, including:

an actuator configured to adjust a size of the gap between the surface of the magnetic levitation bearing and the surface of the rotor;
at least one laser configured to measure a dimension of at least one of the magnetic levitation bearing and the rotor; and
a controller configured to control the actuator based upon a change in the dimension measured by the laser.

15. A method for maintaining a gap between a surface of an object to be tested and a surface of a rotor disposed within a sealable chamber having an interior environment maintained at a pressure, the method comprising:
setting a predetermined pressure of the chamber;
rotating the rotor;
setting the gap between the surface of the object to be tested and the surface of the rotor;
measuring, using at least one laser, a dimension of at least one of the object to be tested and the rotor;
maintaining the gap between the surface of the object to be tested and the surface of the rotor by adjusting, with an actuator, at least one of the object to be tested and the rotor based upon a change, as measured by the at least one laser, in the dimension of at least one of the object to be tested and the rotor,
wherein the object to be tested is one of an air bearing and a magnetic levitation bearing.

16. The method for maintaining the gap of claim 15, further comprising:
setting the predetermined pressure of the interior environment of the chamber to a pressure between 0.006 atmosphere and 0.018 atmosphere, and
rotating the rotor so as to achieve a surface speed that exceeds 300 meters per second.

17. The method for maintaining the gap of claim 15, wherein the sealable chamber comprises a cylindrical pressure vessel.

18. The method for maintaining the gap of claim 15, wherein a diameter of the surface of object is concentric with a diameter of the surface of the rotor.

* * * * *